US012775181B2

(12) United States Patent
Kim et al.

(10) Patent No.: US 12,775,181 B2
(45) Date of Patent: Oct. 27, 2026

(54) DISPLAY DEVICE AND METHOD OF MANUFACTURING THE SAME

(71) Applicant: Samsung Display Co., Ltd., Yongin-si (KR)

(72) Inventors: Woongsik Kim, Yongin-si (KR); Sikwang Kim, Yongin-si (KR); Donghwan Bae, Yongin-si (KR); Jin-Su Byun, Yongin-si (KR); Juhyun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 258 days.

(21) Appl. No.: 18/483,446

(22) Filed: Oct. 9, 2023

(65) Prior Publication Data

US 2024/0134222 A1 Apr. 25, 2024
US 2024/0231141 A9 Jul. 11, 2024

(30) Foreign Application Priority Data

Oct. 19, 2022 (KR) ........................ 10-2022-0135069

(51) Int. Cl.
*G02F 1/1335* (2006.01)
*G02B 5/28* (2006.01)

(52) U.S. Cl.
CPC ....... *G02F 1/133512* (2013.01); *G02B 5/287* (2013.01)

(58) Field of Classification Search
None
See application file for complete search history.

(56) References Cited

U.S. PATENT DOCUMENTS

| | | | | |
|---|---|---|---|---|
| 8,213,082 | B2 | 7/2012 | Gaides et al. | |
| 2020/0168844 | A1* | 5/2020 | Kim | H10K 59/352 |
| 2020/0321400 | A1 | 10/2020 | Park et al. | |
| 2021/0217990 | A1* | 7/2021 | Kim | H10K 59/873 |
| 2022/0037415 | A1* | 2/2022 | Lin | H10K 59/126 |

FOREIGN PATENT DOCUMENTS

| | | | |
|---|---|---|---|
| KR | 10-2002-0037443 | A | 5/2002 |
| KR | 10-2018-0084333 | A | 7/2018 |
| KR | 10-2019-0099304 | A | 8/2019 |
| KR | 10-2020-0063591 | A | 6/2020 |
| KR | 10-2020-0117080 | A | 10/2020 |
| KR | 10-2021-0092351 | A | 7/2021 |

* cited by examiner

*Primary Examiner* — Shan Liu
(74) *Attorney, Agent, or Firm* — Womble Bond Dickinson (US) LLP

(57) ABSTRACT

A display device includes a light-emitting element, an encapsulation layer covering the light-emitting element, an etch protection layer on the encapsulation layer, a first light-blocking pattern protruding from an upper surface of the etch protection layer, and including a first light-blocking material, an organic layer covering the first light-blocking pattern, and defining a trench exposing an upper surface of the first light-blocking pattern, and a second light-blocking pattern in the trench, including a second light-blocking material, and defining an inner space surrounded by the second light-blocking material.

11 Claims, 39 Drawing Sheets

DISPLAY DEVICE AND METHOD OF MANUFACTURING THE SAME

CROSS-REFERENCE TO RELATED APPLICATION

This application claims priority to, and the benefit of, Korean Patent Application No. 10-2022-0135069, filed on Oct. 19, 2022, which is hereby incorporated by reference for all purposes as if fully set forth herein.

BACKGROUND

1. Field

Embodiments provide a display device, and a method of manufacturing the display device.

2. Description of the Related Art

A display device is a device displaying an image. Various electronic devices, such as smartphone, digital camera, computer, navigation, television, etc., include a display device.

Generally, a display device displays an image having a relatively wide viewing angle, but the viewing angle of the image displayed on the display device may be limited to improve security, etc.

SUMMARY

Embodiments provide a display device capable of limiting a viewing angle of an image.

Embodiments provide a method of manufacturing the display device.

A display device according to embodiments of the present disclosure may include a light-emitting element, an encapsulation layer covering the light-emitting element, an etch protection layer on the encapsulation layer, a first light-blocking pattern protruding from an upper surface of the etch protection layer, and including a first light-blocking material, an organic layer covering the first light-blocking pattern, and defining a trench exposing an upper surface of the first light-blocking pattern, and a second light-blocking pattern in the trench, including a second light-blocking material, and defining an inner space surrounded by the second light-blocking material.

The first light-blocking material may include a photoresist material, wherein the second light-blocking material includes metal or metal oxide.

The first light-blocking pattern may have tapered sides in a cross sectional view.

The inner space defined by the second light-blocking pattern may be surrounded by the second light-blocking material.

An upper surface of the organic layer and an upper surface of the second light-blocking pattern may be substantially level.

A display device according to embodiments of the present disclosure may include a light-emitting element, an encapsulation layer covering the light-emitting element, an etch protection layer on the encapsulation layer, a first organic layer on the etch protection layer, and defining a first trench exposing a portion of an upper surface of the etch protection layer, a first light-blocking pattern in the first trench, including a first light-blocking material, and defining a first inner space surrounded by the first light-blocking material, a second organic layer on the first organic layer, and defining a second trench exposing at least a portion of the first light-blocking pattern, and a second light-blocking pattern in the second trench, including a second light-blocking material, and defining a second inner space surrounded by the second light-blocking material.

The first light-blocking material and the second light-blocking material may include metal or metal oxide.

The first inner space may be completely surrounded by the first light-blocking material, wherein the second inner space is completely surrounded by the second light-blocking material.

The first light-blocking pattern may directly contact the second light-blocking pattern.

A refractive index of the first organic layer may be different from a refractive index of the second organic layer.

An upper surface of the second organic layer and an upper surface of the second light-blocking pattern may be substantially level.

The display device may further include a first transparent layer between the first organic layer and the second organic layer, and defining a first slit pattern corresponding to the first trench.

The first light-blocking pattern may be in the first slit pattern, wherein an upper surface of the first light-blocking pattern and an upper surface of the first transparent layer are substantially level.

A method of manufacturing a display device according to embodiments of the present disclosure may include forming an encapsulation layer covering a light-emitting element, forming an etch protection layer on the encapsulation layer, forming a first organic layer on the etch protection layer, the first organic layer defining a first trench exposing a portion of an upper surface of the etch protection layer, forming a first light-blocking pattern covering at least a portion of a side surface of the first organic layer defining the first trench, forming a second organic layer on the first organic layer, the second organic layer defining a second trench exposing at least a portion of the first light-blocking pattern, and forming a second light-blocking pattern covering at least a portion of a side surface of the second organic layer defining the second trench.

The forming the first organic layer may include forming a first preliminary organic layer on the etch protection layer, forming a first preliminary transparent layer on the first preliminary organic layer, forming a first preliminary photoresist layer on the first preliminary transparent layer, forming a first photoresist layer defining a first opening corresponding to the first trench, and exposing a portion of an upper surface of the first preliminary transparent layer by removing a portion of the first preliminary photoresist layer, forming a first transparent layer defining a first silt pattern corresponding to the first trench, and exposing a portion of an upper surface of the first preliminary organic layer by etching the first preliminary transparent layer using the first photoresist layer as a mask, and etching the first preliminary organic layer using the first photoresist layer and the first transparent layer as a mask.

The forming the first light-blocking pattern may include depositing a first light-blocking material to cover an upper surface and a side surface of the first photoresist layer, at least a portion of a side surface of the first transparent layer, and at least the side surface of the first organic layer defining the first trench, and removing the first light-blocking material covering the upper surface and the side surface of the first photoresist layer by removing the first photoresist layer.

The forming the first light-blocking pattern may further include removing the first light-blocking material and the first transparent layer positioned at a higher level than a level of an upper surface of the first organic layer.

The first light-blocking material covering the side surface of the first photoresist layer may be spaced apart from the first light-blocking material covering at least the portion of the side surface of the first transparent layer.

Forming the second organic layer may include forming a second preliminary organic layer on the first organic layer, forming a second preliminary transparent layer on the second preliminary organic layer, forming a second preliminary photoresist layer on the second preliminary transparent layer, forming a second photoresist layer defining a second opening corresponding to the second trench, and exposing a portion of an upper surface of the second preliminary transparent layer by removing a portion of the second preliminary photoresist layer, forming a second transparent layer defining a second slit pattern corresponding to the second trench, and exposing a portion of an upper surface of the second preliminary organic layer by etching the second preliminary transparent layer using the second photoresist layer as a mask, and etching the second preliminary organic layer using the second photoresist layer and the second transparent layer as a mask.

The forming the second light-blocking pattern may include depositing a second light-blocking material to cover an upper surface and a side surface of the second photoresist layer, at least a portion of a side surface of the second transparent layer, and at least a side surface of the second organic layer defining the second trench, removing the second light-blocking material covering the upper surface and the side surface of the second photoresist layer by removing the second photoresist layer, and removing the second transparent layer and the second light-blocking material positioned at a higher level than a level of an upper surface of the second organic layer.

The display device according to embodiments may include a light-blocking element including two light-blocking patterns stacked sequentially. Accordingly, a width of each of the two light-blocking patterns may be relatively small.

The method of manufacturing the display device according to embodiments may include forming a light-blocking element including two light-blocking patterns stacked sequentially. The light-blocking element may be formed on an encapsulation layer, and accordingly, attaching a separately manufactured light-blocking element film on the encapsulation layer may be omitted.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
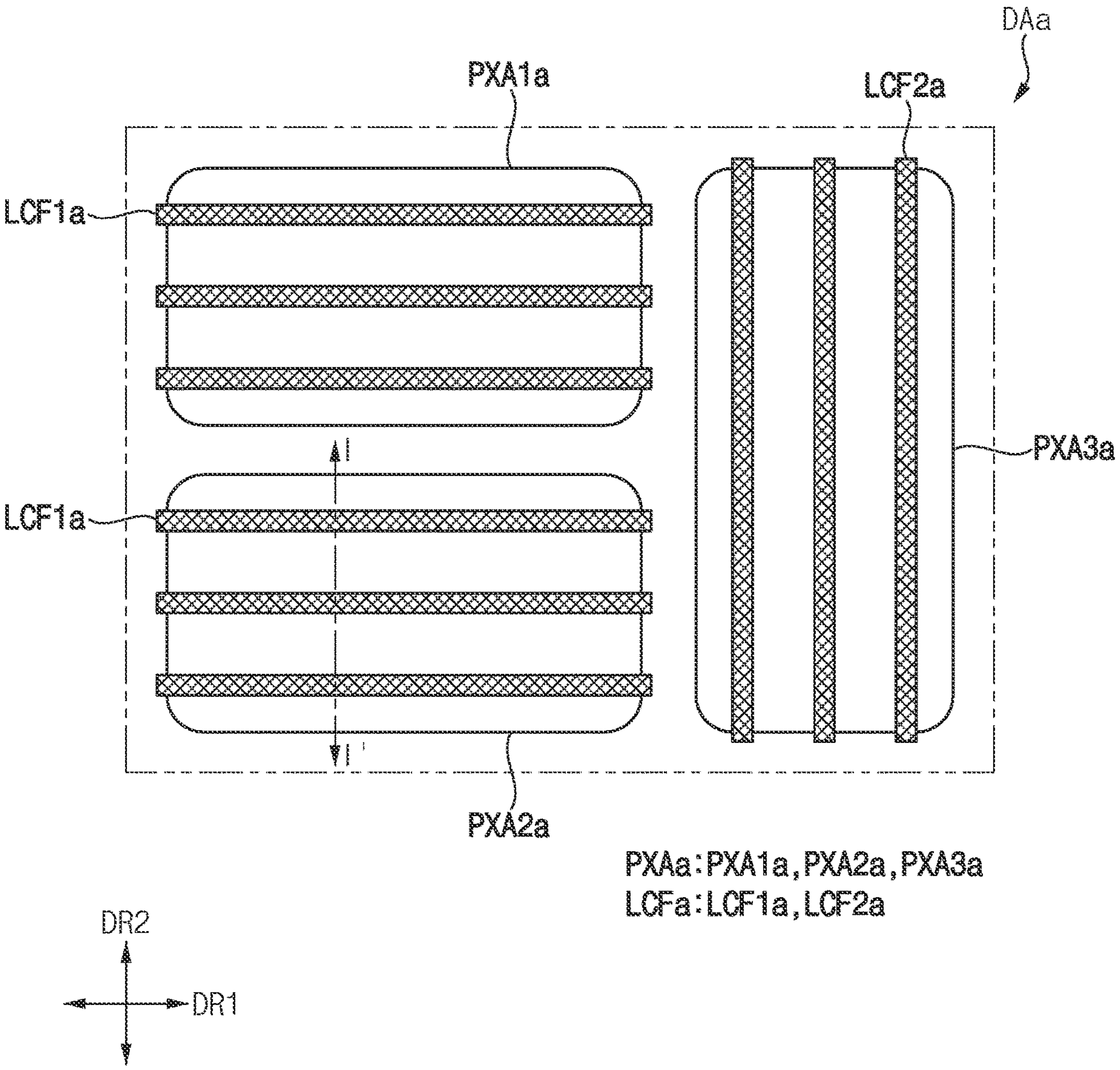
FIG. 1 is a plan view illustrating a display area of a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a plan view illustrating a display area of a display device according to one or more embodiments.

Referring to FIG. 1, a display device according to one or more embodiments may include a display area DAa. The display area DAa may be a portion of an area in which an image is displayed.

The display area DAa may include a pixel area PXAa. The pixel area PXAa may be an area that emits light. For example, the pixel area PXAa may be an area in which light is substantially emitted from a light-emitting material (for example, ELa of FIG. 2).

In one or more embodiments, the pixel area PXAa may include a first pixel area PXA1*a*, a second pixel area PXA2*a*, and a third pixel area PXA3*a*.

Light of respective colors may be emitted from the first to third pixel areas PXA1*a*, PXA2*a*, and PXA3*a*. For example, red light may be emitted from the first pixel area PXA1*a*, green light may be emitted from the second pixel area PXA2*a*, and blue light may be emitted from the third pixel area PXA3*a*, although the present disclosure is not limited thereto. For example, lights emitted from the first to third pixel area PXA1*a*, PXA2*a*, and PXA3*a* may have substantially the same color.

The first to third pixel areas PXA1*a*, PXA2*a*, and PXA3*a* may have different planar areas. For example, an area of the third pixel area PXA3*a* may be larger than an area of the first pixel area PXA1*a*, although the present disclosure is not limited thereto. For example, the first to third pixel areas PXA1*a*, PXA2*a*, and PXA3*a* may have substantially the same area.

Each of the first pixel area PXA1*a* and the second pixel area PXA2*a* may extend in a first direction DR1, and the third pixel area PXA3*a* may extend in a second direction DR2 crossing the first direction DR1. The first pixel area PXA1*a* and the second pixel area PXA2*a* may be arranged along the second direction DR2, and the third pixel area PXA3*a* may be located adjacent to each of the first pixel area PXA1*a* and the second pixel area PXA2*a* in the first direction DR1, although the present disclosure is not limited thereto. For example, the first to third pixel areas PXA1*a*, PXA2*a*, and PXA3*a* may have various arrangement (for example, diamond arrangement, stripe arrangement, etc.) when viewed in a plan view.

A light-blocking element LCFa may be located to overlap a portion of the pixel area PXAa. The light-blocking element LCFa may limit a viewing angle of light emitted from the pixel area PXAa. Accordingly, light emitted from the pixel area PXAa may have a relatively narrow viewing angle by passing through the light-blocking element LCFa.

The light-blocking element LCFa may include first light-blocking elements LCF1*a* extending in the first direction DR1, and second light-blocking elements LCF2*a* extending in the second direction DR2. The first light-blocking elements LCF1*a* may overlap the first pixel area PXA1*a* and the second pixel area PXA2*a* to limit a viewing angle of light emitted from each of the first pixel area PXA1*a* and the second pixel area PXA2*a* in a direction crossing the first direction DR1. The second light-emitting elements LCF2*a* may overlap the third pixel area PXA3*a* to limit a viewing angle of light emitted from the third pixel area PXA3*a* in a direction crossing the second direction DR2.

However, the above-described planar shape of the light-blocking element LCFa is merely an example, and the present disclosure is not limited thereto. The light-blocking element LCFa may have various planar shapes capable of limiting a viewing angle of light that is emitted from the pixel area PXAa. For example, the light-blocking element LCFa may have a mesh-shape overlapping the pixel area PXAa. For another example, the light-blocking element LCFa may have a closed-curve shape (for example, circle, ellipse, triangle, rectangle, pentagon, etc.) overlapping the pixel area PXAa. Hereinafter, for convenience of description, the planar shape of the light-blocking element LCFa shown in FIG. 1 will be described as a reference.

Figure 2:
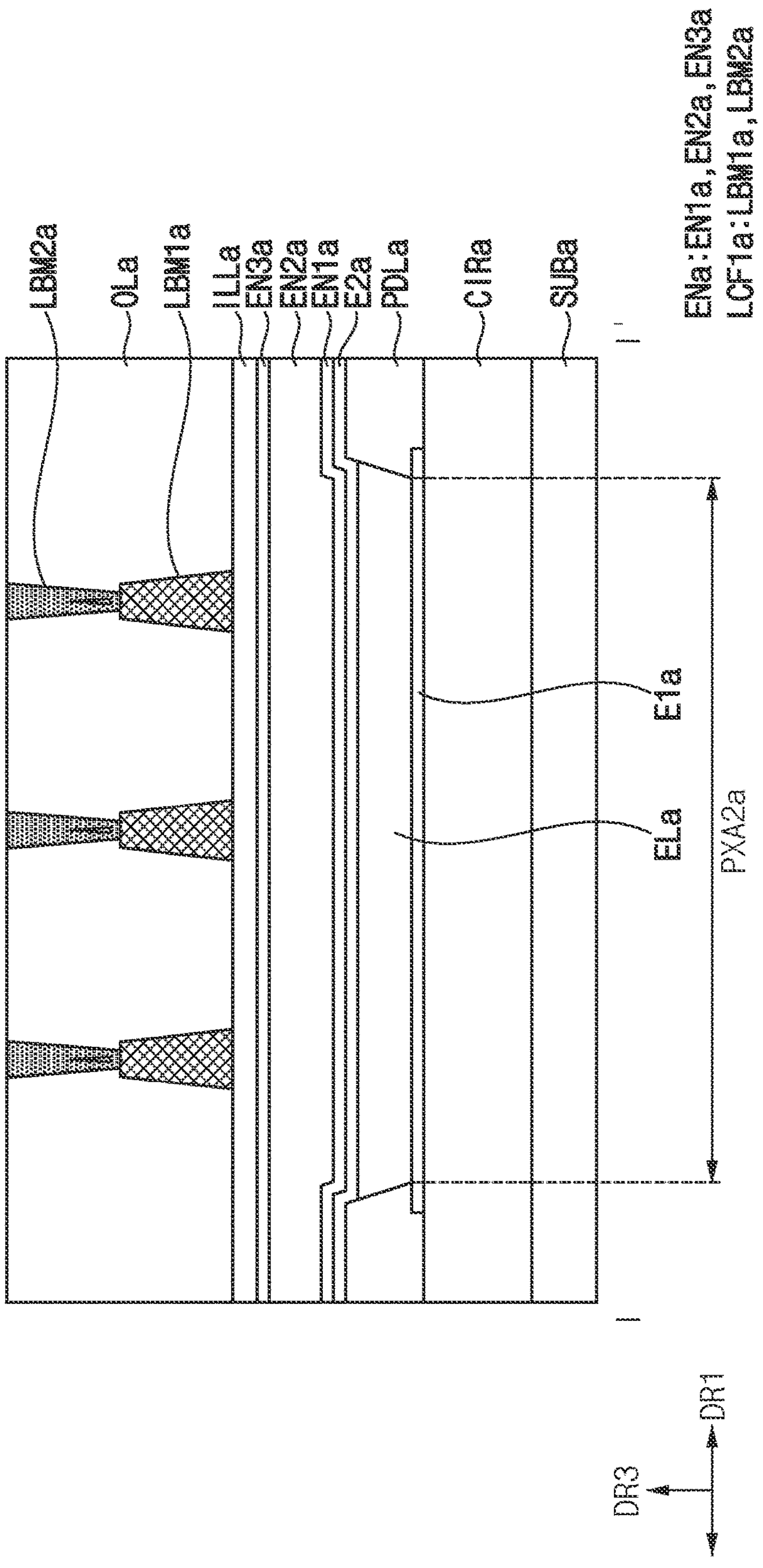
FIG. 2 is a cross-sectional view taken along the line I-I' of FIG. 1.

FIG. 2 is a cross-sectional view taken along the line I-I' of FIG. 1.

Referring to FIG. 2, the display device according to one or more embodiments may include a substrate SUBa, a circuit layer CIRa, a first electrode Ela, a pixel-defining layer PDLa, a light-emitting material ELa, a second electrode E2_a_, an encapsulation layer ENa, an etch protection layer ILLa, the first light-blocking element LCF1_a_, and an organic layer OLa.

The substrate SUBa may include glass, plastic, etc. In one or more embodiments, the substrate SUBa may have flexibility.

The circuit layer CIRa may be located on the substrate SUBa. The circuit layer CIRa may include a plurality of insulation layers and a plurality of transistors. For example, the circuit layer CIRa may include a driving transistor for generating a driving current.

The first electrode E1_a_ may be located on the circuit layer CIRa. The first electrode E1_a_ may include a conductive material. For example, the first electrode E1_a_ may include silver, alloy including silver, titanium, alloy including titanium, molybdenum, alloy including molybdenum, aluminum, alloy including aluminum, indium tin oxide, indium zinc oxide, etc. The first electrode E1_a_ may be electrically connected to the driving transistor. In one or more embodiments, the first electrode E1_a_ may be referred to as an anode electrode.

The pixel-defining layer PDLa may be located on the circuit layer CIRa and the first electrode E1_a_. The pixel-defining layer PDLa may define a pixel opening exposing at least a portion of an upper surface of the first electrode E1_a_. The pixel-defining layer PDLa may include an organic insulation material. For example, the pixel-defining layer PDLa may include acrylic resin, methacrylic resin, polyisoprene, vinyl resin, epoxy resin, urethane resin, cellulose resin, siloxane resin, polyimide resin, polyamide resin, perylene resin, etc.

The light-emitting material ELa may be located on the first electrode E1_a_ in the pixel opening. The light-emitting material ELa may include a material for emitting light. For example, the light-emitting material ELa may include an organic light-emitting material.

The second electrode E2_a_ may cover the light-emitting material ELa and the pixel-defining layer PDLa. The second electrode E2_a_ may include a conductive material. For example, the second electrode E2_a_ may include silver, alloy including silver, titanium, alloy including titanium, molybdenum, alloy including molybdenum, aluminum, alloy including aluminum, indium tin oxide, indium zinc oxide, etc. The first electrode E1_a_ may be electrically connected to the driving transistor. In one or more embodiments, the second electrode E2_a_ may be referred to as a cathode electrode.

The encapsulation layer ENa may cover the second electrode E2_a_. The encapsulation layer ENa may protect the second electrode E2_a_, the light-emitting material ELa, the first electrode E1_a_, and the circuit layer CIRa from external moisture and gas. In one or more embodiments, the encapsulation layer ENa may include a first inorganic encapsulation layer EN1_a_, an organic encapsulation layer EN2_a_ located on the first inorganic encapsulation layer EN1_a_, and a second inorganic encapsulation layer EN3_a_ located on the organic encapsulation layer EN2_a_.

The etch protection layer ILLa may be located on the encapsulation layer ENa. The etch protection layer ILLa may include an inorganic insulation material. For example, the etch protection layer ILLa may include silicon nitride, silicon oxynitride, etc.

The organic layer OLa may be located on the etch protection layer ILLa. The organic layer OLa may include an organic insulation material having relatively large light transmittance. For example, the organic layer OLa may include siloxane-based material and/or silica-based material.

The first light-blocking elements LCF1_a_ may be located on the etch protection layer ILLa. The first light-blocking elements LCF1_a_ may be located in trenches, or grooves, that are defined by the organic layer OLa. The first light-blocking elements LCF1_a_ may extend in a third direction DR3 crossing the first direction DR1 and the second direction DR2.

Each of the first light-blocking elements LCF1_a_ may include a first light-blocking pattern LBM1_a_ and a second light-blocking pattern LBM2_a_. The first light-blocking pattern LBM1_a_ may protrude in the third direction DR3 from an upper surface of the etch protection layer ILLa. The second light-blocking pattern LBM2_a_ may be located on the first light-blocking pattern LBM1_a_. The second light-blocking pattern LBM2_a_ may contact an upper surface of the first light-blocking pattern LBM1_a_.

The first light-blocking pattern LBM1_a_ may include a material having a relatively large light absorption rate, and the second light-blocking pattern LBM2_a_ may include a material having a relatively low reflectance. For example, the first light-blocking pattern LBM1_a_ may include photosensitive material having a relatively large light absorption rate, and the second light-blocking pattern LBM2_a_ may include a metal (or metal oxide) having a relatively low reflectance.

In one or more embodiments, the second light-blocking pattern LBM2_a_ may be formed by depositing a second light-blocking material, and accordingly, the second light-blocking pattern LBM2_a_ may define a space/inner space (for example, LBM2_a__ES of FIG. 12) not filled with the second light-blocking material. The space not filled with the second light-blocking material will be described later in detail with reference to FIG. 12.

In FIG. 2, one or more embodiments in which a width of the first light-blocking pattern LBM1_a_ (e.g., in the first direction DR1) is larger than a width of the second light-blocking pattern LBM2_a_ (e.g., in the first direction DR1) has been shown, the present disclosure is not limited thereto. For example, the width of the first light-blocking pattern LBM1_a_ may be substantially the same as the width of the second light-blocking pattern LBM2_a_. For another example, the width of the first light-blocking pattern LBM1_a_ may be less than the width of the second light-blocking pattern LBM2_a_.

FIG. 3 to FIG. 12 are diagrams illustrating a method of manufacturing the display device of FIG. 1.

Figure 3:
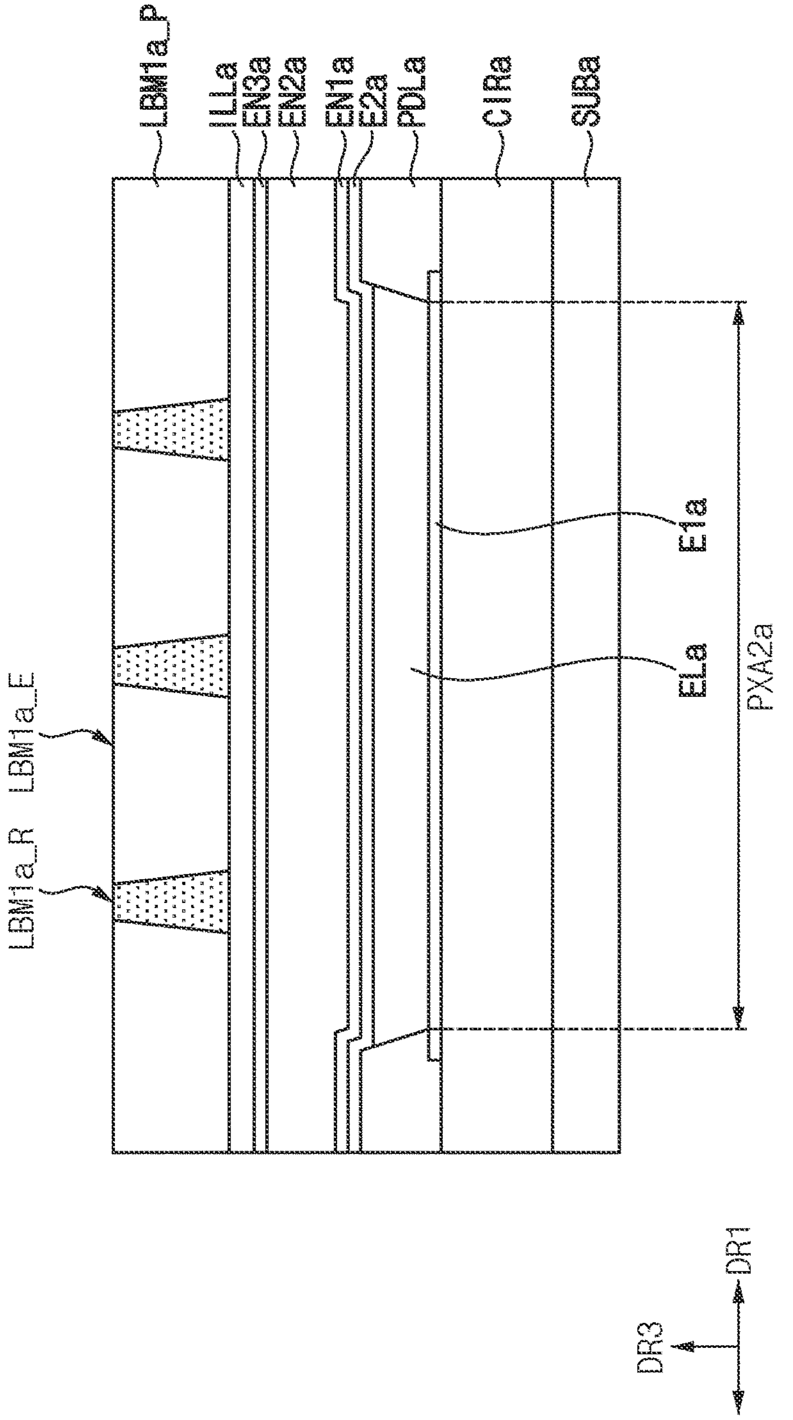
FIG. 3 to FIG. 12 are diagrams illustrating a method of manufacturing the display device of FIG. 1.
Figure 4:
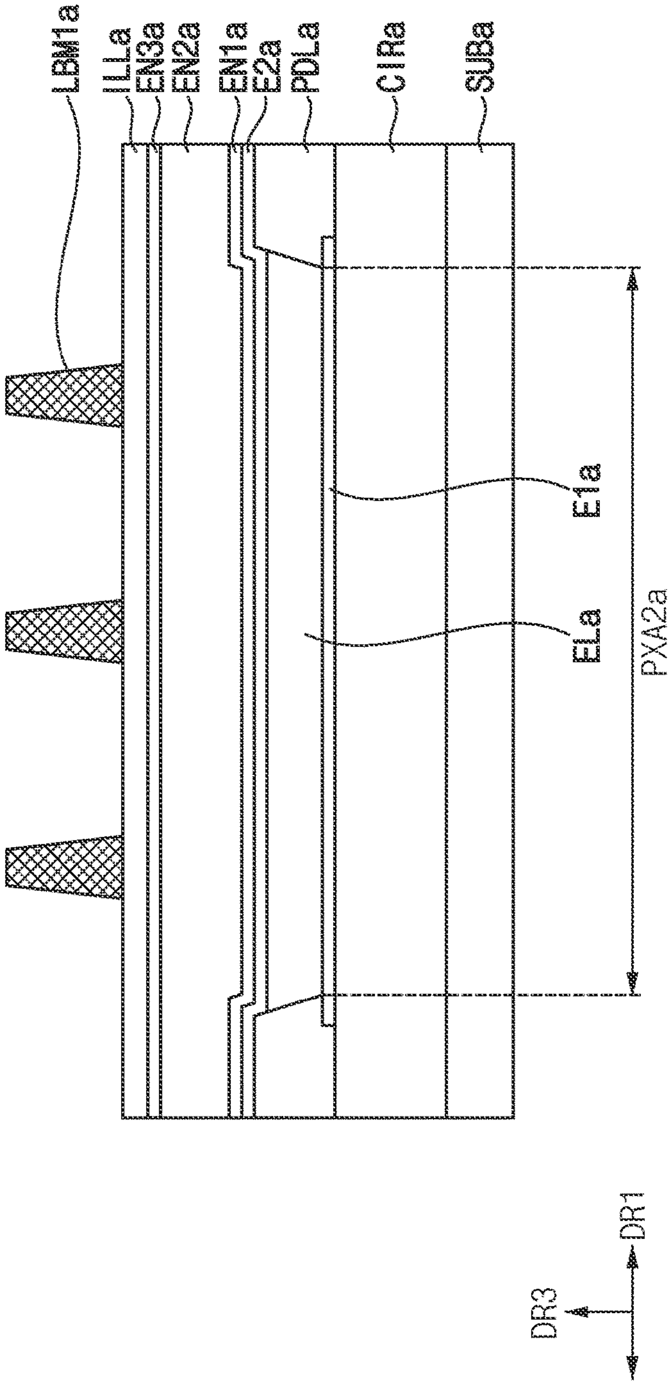

FIG. 3 and FIG. 4 are diagrams illustrating a method of forming the first light-blocking pattern LBM1_a_.

Referring to FIG. 3, a first light-blocking material LBM1_a__P may be applied on the etch protection layer ILLa. The first light-blocking material LBM1_a__P may include a photosensitive material (for example, photoresist material) having a relatively large light absorption rate.

After applying the first light-blocking material LBM1_a__P, a portion of the first light-blocking material LBM1_a__P may be exposed to light. In one or more embodiments, when the first light-blocking material LBM1_a__P includes a positive type photoresist material, an elimination portion LBM1_a__E of the first light-blocking material LBM1_a__P may be exposed to light, and a remaining portion LBM1_a__R might not be exposed to light. In one or more other embodiments, when the first light-blocking material LBM1_a__P includes a negative type photoresist material, the elimination portion LBM1_a__E of the first light-blocking material LBM1_a__P might not be exposed to light, and the remaining portion LBM1*a*_R of the first light-blocking material LBM1*a*_P may be exposed to light.

Referring to FIG. 4, after exposing the portion of the first light-blocking material LBM1*a*_P, the elimination portion LBM1*a*_E of the first light-blocking material LBM1*a*_P may be developed. Accordingly, the elimination portion LBM1*a*_E may be removed, and the remaining portion LBM1*a*_R of the first light-blocking material LBM1*a*_P may form the first light-blocking pattern LBM1*a*.

In this case, the first light-blocking pattern LBM1*a* formed by exposing and developing of the first light-blocking material LBM1*a*_P may have a positively tapered sides in a cross-sectional view. In other words, the first light-blocking pattern LBM1*a* may have a trapezoidal shape in a cross-sectional view, and an upper side of the trapezoidal shape may be shorter, or may have a narrower width, than a lower side of the trapezoidal shape.

FIG. 5, FIG. 6, FIG. 7, FIG. 8, and FIG. 9 are diagrams illustrating a method of forming the organic layer OLa.

Figure 5:
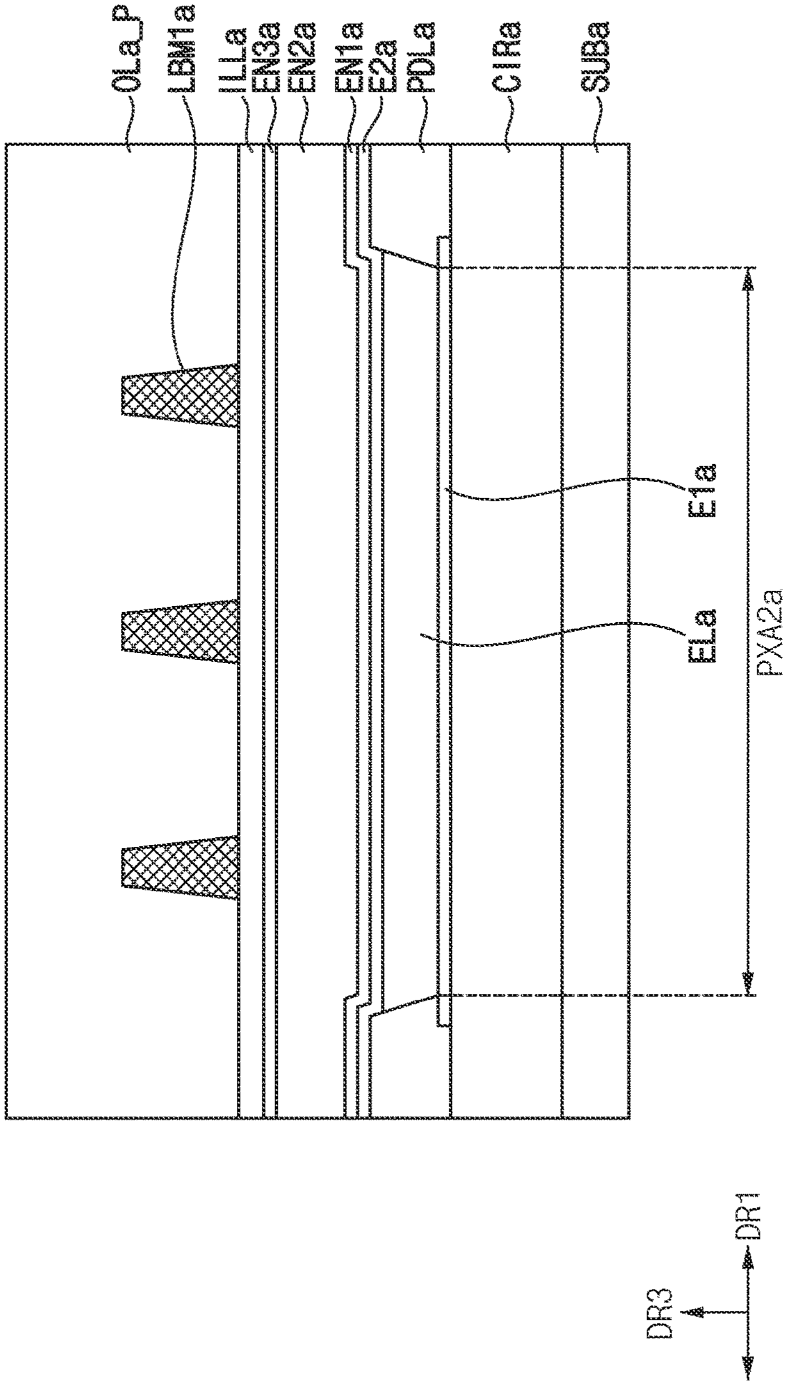

Referring to FIG. 5, a preliminary organic layer OLa_P may be formed on the etch protection layer ILLa. The preliminary organic layer OLa_P may have a relatively large thickness to cover the first light-blocking pattern LBM1*a*. In other words, the thickness of the preliminary organic layer OLa_P in the third direction DR3 may be larger than a thickness of the first light-blocking pattern LBM1*a* in the third direction DR3.

The preliminary organic layer OLa_P may have substantially the same material as the material included in the organic layer OLa described with reference to FIG. 2. For example, the preliminary organic layer OLa_P may include siloxane-based material and/or silica-based material. In this case, because the preliminary organic layer OLa_P includes the siloxane-based material and/or the silica-based material, the preliminary organic layer OLa_P may have improved light transmittance.

Figure 6:
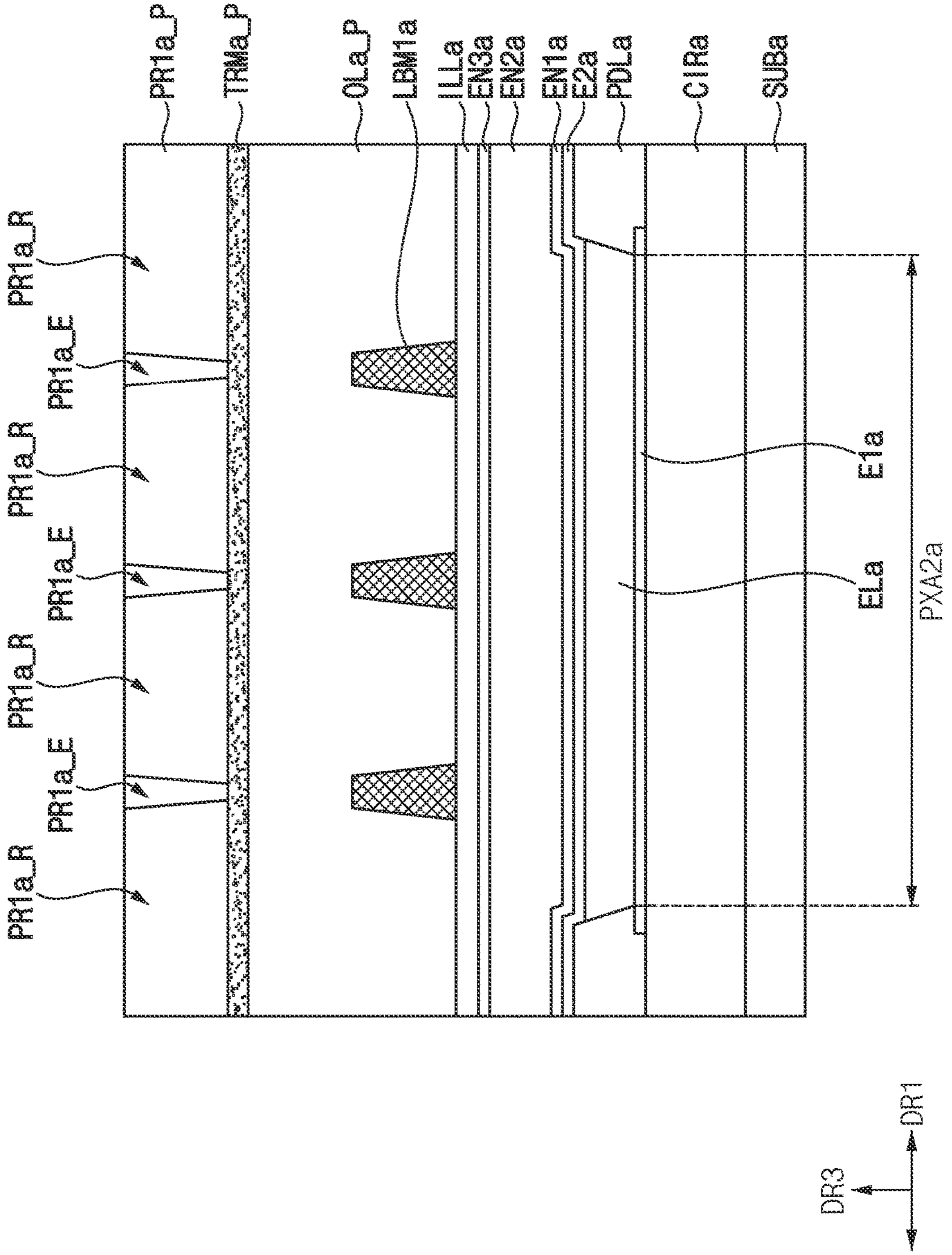

Referring to FIG. 6, a preliminary transparent layer TRMa_P may be formed on the preliminary organic layer OLa_P. The preliminary transparent layer TRMa_P may include a transparent conductive material. For example, the preliminary transparent layer TRMa_P may include metal oxide (for example, ITO, etc.). For another example, the preliminary transparent layer TRMa_P may include metal (for example, aluminum, etc.).

After forming the preliminary transparent layer TRMa_P, a preliminary photoresist layer PR1*a*_P may be formed on the preliminary transparent layer TRMa_P. The preliminary photoresist layer PR1*a*_P may include a photosensitive material.

After forming the preliminary photoresist layer PR1*a*_P, a portion of the preliminary photoresist layer PR1*a*_P may be exposed to light. In one or more embodiments, when the preliminary photoresist layer PR1*a*_P includes positive type photoresist material, an elimination portion PR1*a*_E of the preliminary photoresist layer PR1*a*_P may be exposed to light, and a remaining portion PR1*a*_R of preliminary photoresist layer PR1*a*_P might not be exposed to light. In one or more other embodiments, when the preliminary photoresist layer PR1*a*_P includes negative type photoresist material, the remaining portion PR1*a*_R of the preliminary photoresist layer PR1*a*_P may be exposed to light, and the elimination portion PR1*a*_E of the preliminary photoresist layer PR1*a*_P might not be exposed to light.

Figure 7:
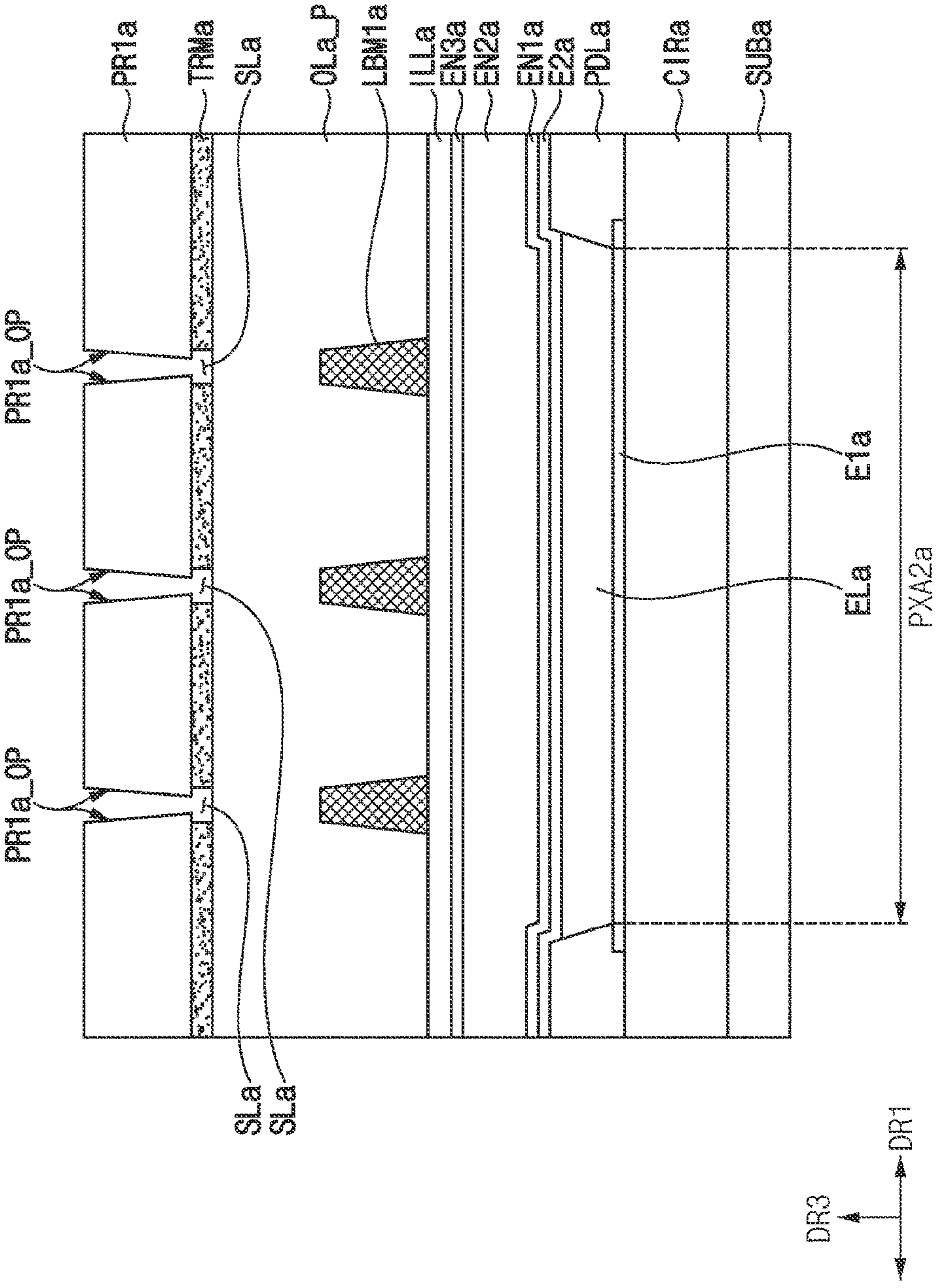

Referring to FIG. 7, after exposing the portion of the preliminary photoresist layer PR1*a*_P, the elimination portion PR1*a*_E of preliminary photoresist layer PR1*a*_P may be developed. Accordingly, the elimination portion PR1*a*_E of preliminary photoresist layer PR1*a*_P may be removed, and the remaining portion PR1*a*_R of the preliminary photoresist layer PR1*a*_P may form a photoresist layer PR1*a*. In this case, an opening PR1*a*_OP corresponding to the elimination portion PR1*a*_E of the preliminary photoresist layer PR1*a*_P may be defined in the photoresist layer PR1. By the opening PR1*a*_OP, a portion of an upper surface of the preliminary transparent layer TRMa_P described with reference to FIG. 6 may be exposed.

The photoresist layer PR1*a* formed by exposing and developing of the preliminary photoresist layer PR1*a*_P may have a positively tapered sides in a cross-sectional view. In other words, the photoresist layer PR1*a* may have a trapezoidal shape in a cross-sectional view, and an upper side of the trapezoidal shape may be shorter than a lower side of the trapezoidal shape.

After forming the photoresist layer PR1*a*, the preliminary transparent layer TRMa_P may be etched using a photoresist layer PR1*a* as a mask. Accordingly, a portion of the preliminary transparent layer TRMa_P corresponding to the opening PR1*a*_OP may be removed to form the transparent layer TRMa defining a slit pattern SLa. In this case, a portion of an upper surface of the preliminary organic layer OLa_P may be exposed by the slit pattern SLa.

In one or more embodiments, when the preliminary transparent layer TRMa_P includes metal oxide (for example, ITO, etc.), the portion of the preliminary transparent layer TRMa_P may be removed by wet etching. In one or more other embodiments, the preliminary transparent layer TRMa_P includes metal (for example, aluminum, etc.), the portion of the preliminary transparent layer TRMa_P may be removed by dry etching. In this case, in the above described embodiments, a width of the slit pattern SLa (e.g., in the first direction DR1) may be larger than a width of the opening PR1*a*_OP adjacent to the slit pattern SLa (e.g., in the first direction DR1). In other words, an undercut space (e.g., refer to UCA1 of FIG. 19) not contacting the transparent layer TRMa may be formed at a lower surface of the first photoresist layer PR1*a*.

Figure 8:
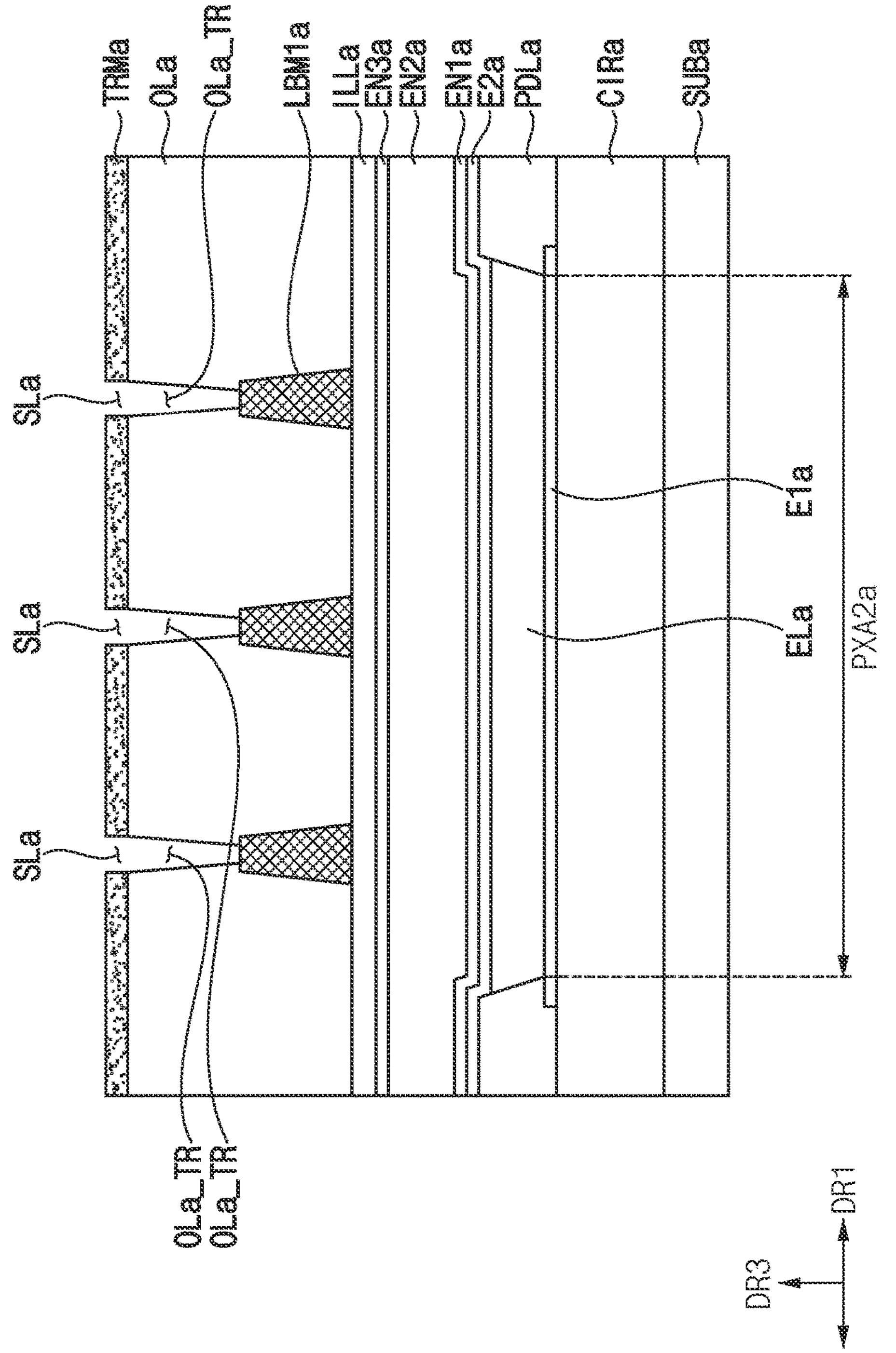

Referring to FIG. 8, after forming the transparent layer TRMa, the photoresist layer PR1*a* may be removed. The method of removing the photoresist layer PR1*a* is not limited, and various know methods may be used.

After removing the photoresist layer PR1*a*, the organic layer OLa may be formed by removing a portion of the preliminary organic layer OLa_P. For example, the portion of the preliminary organic layer OLa_P may be dry-etched using the transparent layer TRMa as a mask. In this case, in the dry-etching of the portion of the preliminary organic layer OLa_P, the first light-blocking pattern LBM1*a* may serve as an etch-stopper. Accordingly, the organic layer OLa defining a trench OLa_TR corresponding to the portion of the preliminary organic layer OLa_P and exposing at least a portion of the first light-blocking pattern LBM1*a*.

As the first light-blocking pattern LBM1*a* serves as the etch-stopper, a thickness of the portion of the preliminary organic layer OLa_P removed by the dry etching may be relatively small. Accordingly, a problem in which a width of the trench OLa_TR formed in the organic layer OLa in the first direction DR1 is excessively increased may not occur.

Figure 9:
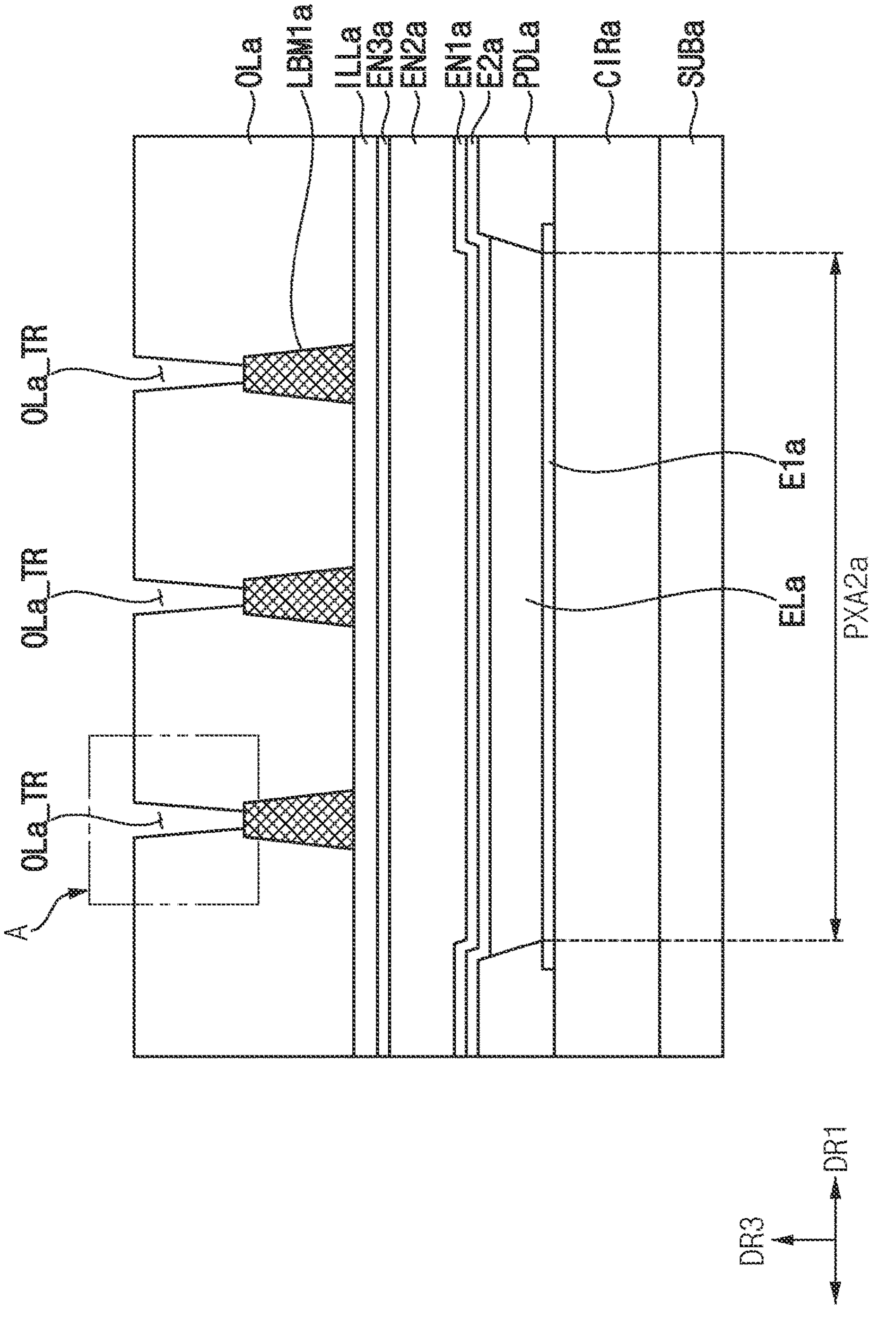

Referring to FIG. 9, after forming the organic layer OLa, the transparent layer TRMa may be removed. The method of removing the transparent layer TRMa is not limited, and various methods may be used.

Figure 10:
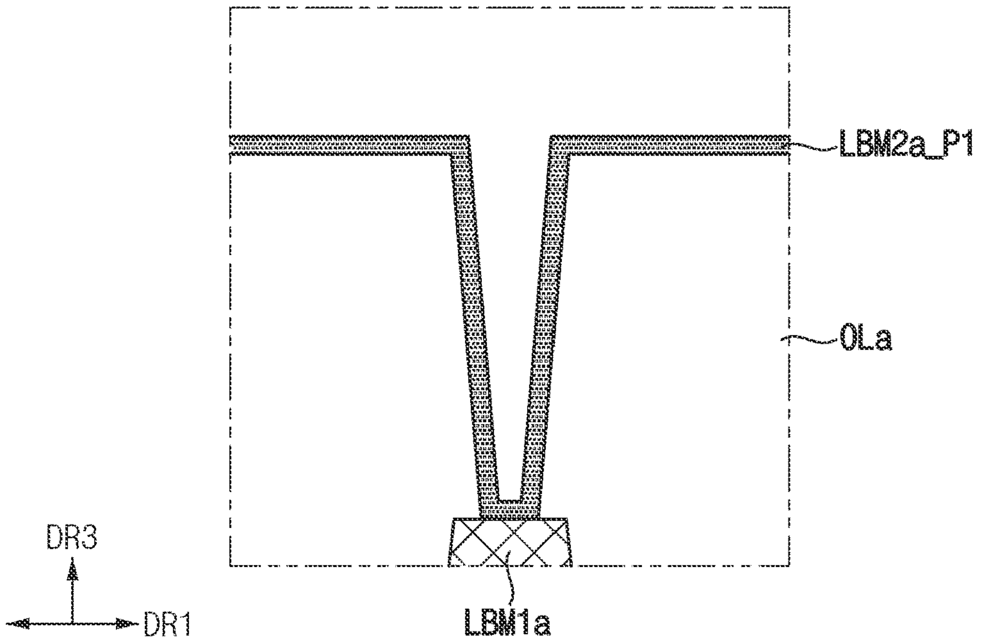
Figure 11:
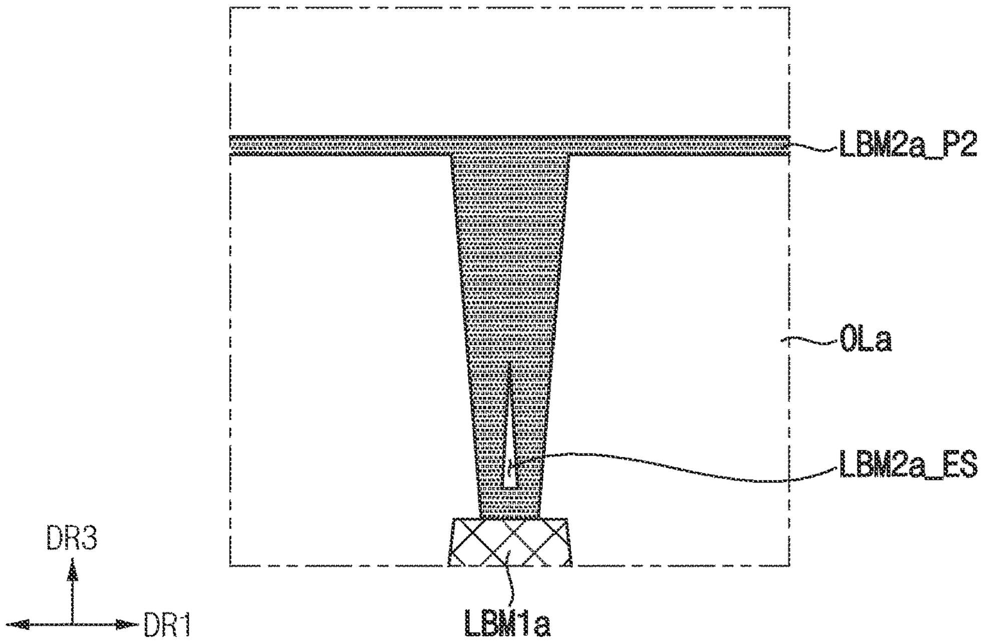
Figure 12:
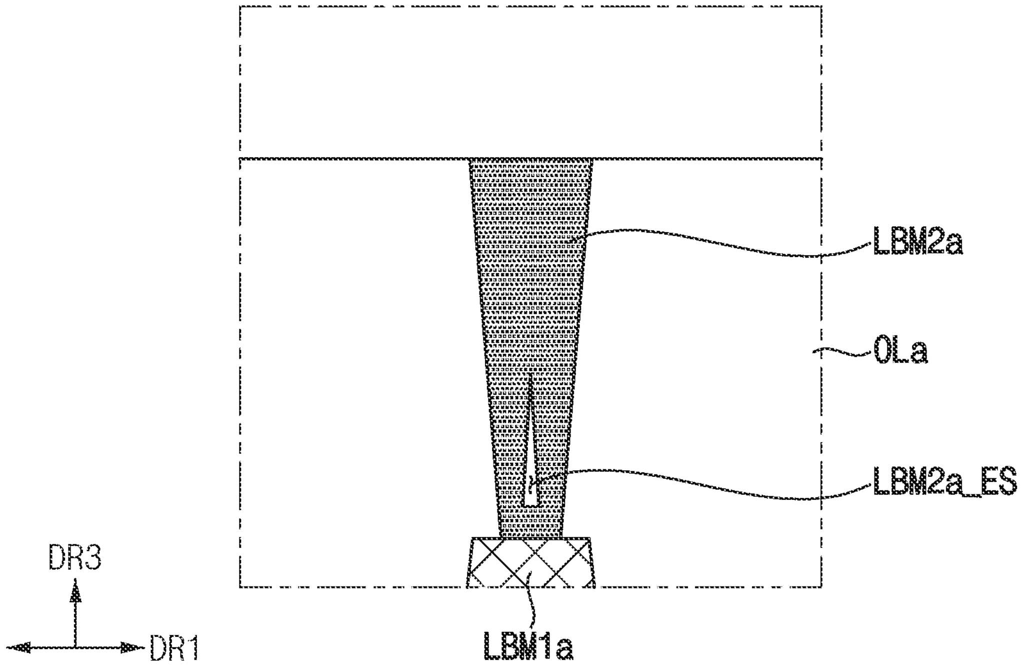

FIG. 10, FIG. 11, and FIG. 12 are diagrams illustrating a method of forming the second light-blocking pattern LBM2*a*.

Referring to FIG. 10, a second light-blocking material may be deposited to cover an upper surface of the organic layer OLa, and the trench OLa_TR formed in the organic layer OLa. The second light-blocking material may have a metal (or metal oxide) having a relatively low reflectance.

In this case, after a relatively short time elapses after the start of the deposition of the second light-blocking material, the second light-blocking material may form a first deposition portion LBM2*a*_P1. The first deposition portion LBM2*a*_P1 may cover the upper surface of the organic layer OLa, the trench OLa_TR formed in the organic layer OLa, and the first light-blocking pattern LBM1*a* exposed by the trench OLa_TR. In this case, the first deposition portion LBM2*a*_P1 may have a relatively uniform, and relatively small, thickness.

Referring to FIG. 11, after a relatively long time elapses after the deposition of the second light-blocking material starts, the second light-blocking material may form a second deposition portion LBM2*a*_P2. In this case, the second deposition portion LBM2*a*_P2 may fill most of the trench OLa_TR.

For example, the second deposition portion LBM2*a*_P2 may fill an upper portion of the trench OLa_TR, and may fill a portion of a lower portion of the trench OLa_TR adjacent to the upper portion of the trench OLa_TR in a direction opposite to the third direction DR3. In this case, the second deposition portion LBM2*a*_P2 may define a space, or inner space, LBM2*a*_ES defined at the lower portion of the trench OLa_TR that is not filled with the second light-blocking material. The space/inner space LBM2*a*_ES may be formed by depositing more of the second light-blocking material at the upper portion of the trench OLa_TR than at the lower portion of the trench OLa_TR as the deposition of the second light-blocking material proceeds. The space LBM2*a*_ES may be formed to be spaced apart from the organic layer OLa and the first light-blocking pattern LBM1*a*. That is, the space LBM2*a*_ES may be surrounded only by the second light-blocking material.

Referring to FIG. 12, the second light-blocking pattern LBM2*a* may be formed by removing a portion of the second light-blocking material positioned at a higher level than the upper surface of the organic layer OLa. Accordingly, a level of the upper surface of the second light-blocking pattern LBM2*a* may be substantially the same as a level of the upper surface of the organic layer OLa. The second light-blocking pattern LBM2*a* may directly contact side surfaces of the organic layer OLa defining the trench OLa_TR and an upper surface of the first light-blocking pattern LBM1*a* exposed by the trench OLa_TR.

Figure 13:
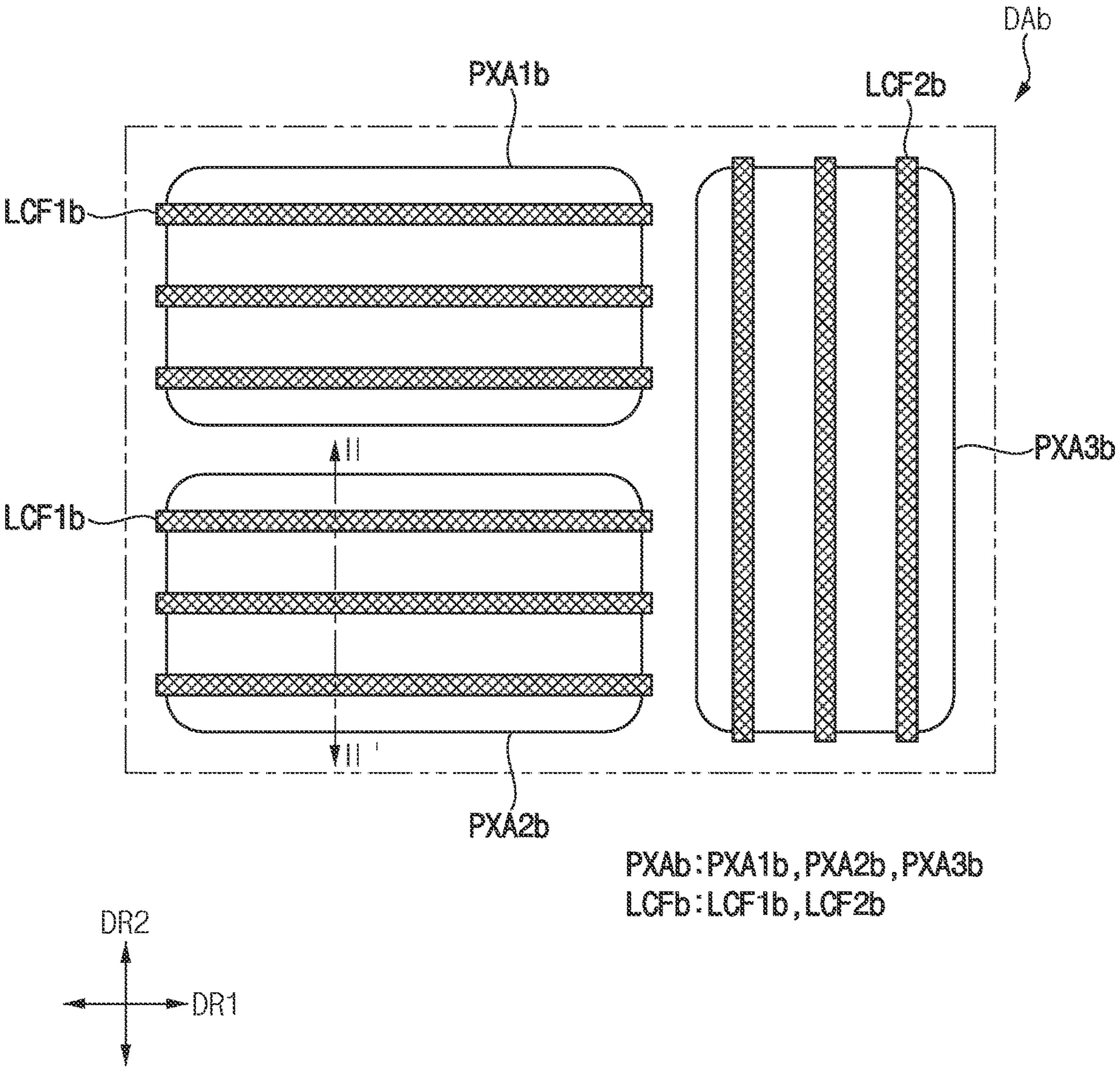
FIG. 13 is a plan view illustrating a display area of a display device according to one or more other embodiments.

FIG. 13 is a plan view illustrating a display area of a display device according to one or more other embodiments.

Referring to FIG. 13, a display device according to one or more other embodiments may include a display area DAb. The display area DAb may be a portion of an area in which an image is displayed.

The display area DAb may include a pixel area PXAb including first to third pixel areas PXA1*b*, PXA2*b*, and PXA3*b*. The pixel area PXAb may be substantially the same as the pixel area PXAa described with reference to FIG. 1. Accordingly, repetitive description of the pixel area PXAb will be omitted.

The display device may include a light-blocking element LCFb for limiting a viewing angle of light emitted from the pixel area PXAb. The light-blocking element LCFb may include first light-blocking elements LCF1*b* and second light-blocking elements LCF2*b*. Shapes and arrangements of the light-blocking element LCFb in a plan view may be substantially the same as the shapes and the arrangements of the light-blocking element LCFa in a plan view described with reference to FIG. 1. Accordingly, hereinafter, a cross-sectional structure of the light-blocking element LCFb may be described.

Figure 14:
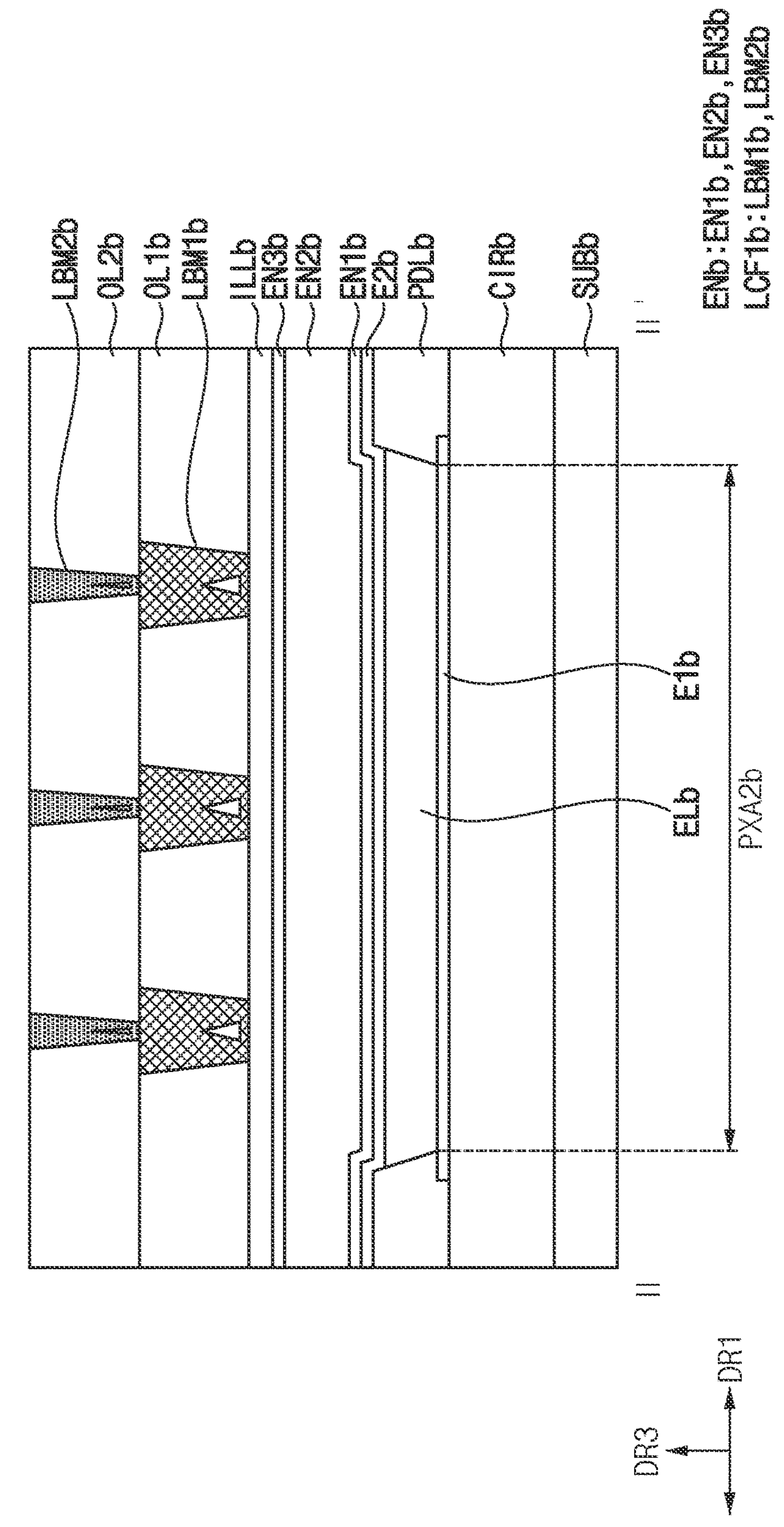
FIG. 14 is a cross-sectional view taken along the line II-II' of FIG. 13

FIG. 14 is a cross-sectional view taken along the line II-II' of FIG. 13.

Referring to FIG. 14, the display device according to one or more other embodiments may include a substrate SUBb, a circuit layer CIRb, a first electrode E1*b*, a pixel-defining layer PDLb, a light-emitting element ELb, a second electrode E2*b*, an encapsulation layer ENb, an etch protection layer ILLb, a first organic layer OL1*b*, a second organic layer OL2*b*, and a first light-blocking element LCF1*b*.

The substrate SUBb, the circuit layer CIRb, the first electrode E1*b*, the pixel-defining layer PDLb, the light-emitting element ELb, the second electrode E2*b*, the encapsulation layer ENb, and the etch protection layer ILLb may be respectively substantially the same as the substrate SUBa, the circuit layer CIRa, the first electrode Ela, the pixel-defining layer PDLa, the light-emitting element ELa, the second electrode E2*a*, the encapsulation layer ENa, and the etch protection layer ILLa described with reference to FIG. 2.

The first organic layer OL1*b* may be located on the etch protection layer ILLb, and the second organic layer OL2*b* may be located on the first organic layer OL1*b*. Each of the first organic layer OL1*b* and the second organic layer OL2*b* may include an organic insulation material having a relatively large light transmittance. For example, each of the first organic layer OL1*b* and the second organic layer OL2*b* may include siloxane-based material and/or silica-based material.

In one or more embodiments, to improve emission efficiency of light emitted from the light-emitting material ELb, a refractive index of the first organic layer OL1*b* may be different from a refractive index of the second organic layer OL2*b*. For example, when the first organic layer OL1*b* and the second organic layer OL2*b* include substantially the same materials, a content ratio of the materials in the first organic layer OL1*b* may be different from a content ratio of the materials in the second organic layer OL2*b*.

The first light-blocking elements LCF1*b* may be located on the etch protection layer ILLb. Each of the first light-blocking elements LCF1*b* may be located in a trench formed in the first organic layer OL1*b* and the second organic layer OL2*b*. The first light-blocking elements LCF1*b* may extend in the third direction DR3.

Each of the first light-blocking elements LCF1*b* may include a first light-blocking pattern LBM1*b* and a second light-blocking pattern LBM2*b*. The first light-blocking pattern LBM1*b* may be located in a first trench or groove (e.g., refer to OL1*b*_TR of FIG. 17) formed in the first organic layer OL1*b*, and the second light-blocking pattern LBM2*b* may be located in a second trench or groove (e.g., refer to OL2*b*_TR of FIG. 26) formed in the second organic layer OL2*b*. In this case, the second light-blocking pattern LBM2*b* may contact an upper surface of the first light-blocking pattern LBM1*b*.

Each of the first light-blocking pattern LBM1*b* and the second light-blocking pattern LBM2*b* may include a material having a relatively low reflectance. For example, each of the first light-blocking pattern LBM1*b* and the second light-blocking pattern LBM2*b* may include a metal (or metal oxide) having a relatively low reflectance.

In one or more embodiments, the first light-blocking pattern LBM1*b* may be formed by depositing a first light-blocking material, and accordingly, the first light-blocking pattern LBM1*b* may define a space/inner space (for example, LBM1*b*_ES of FIG. 19) not filled with the first light-blocking material. The space not filled with the first light-blocking material will be described later with reference to FIG. 19.

In one or more embodiments, the second light-blocking pattern LBM2*b* may be formed by depositing a second light-blocking material, and accordingly, the second light-blocking pattern LBM2*b* may define a space not filled with the second light-blocking material.

In FIG. 14, one or more embodiments in which a width of the first light-blocking pattern LBM1*b* (e.g., in the first direction DR1) is larger than a width of the second light-blocking pattern LBM2*b* (e.g., in the first direction DR1) has been shown, although the present disclosure is not limited thereto. For example, the width of the first light-blocking pattern LBM1*b* may be substantially the same as the width of the second light-blocking pattern LBM2*b*. For another example, the width of the first light-blocking pattern LBM1*b* may be less than the width of the second light-blocking pattern LBM2*b*.

FIG. 15 to FIG. 29 are diagrams illustrating a method of manufacturing the display device of FIG. 13.

FIG. 15, FIG. 16, FIG. 17, FIG. 18, FIG. 19, FIG. 20, FIG. 21, and FIG. 22 are diagrams illustrating a method of forming the first organic layer OL1*b* and the first light-blocking pattern LBM1*b*.

Figure 15:
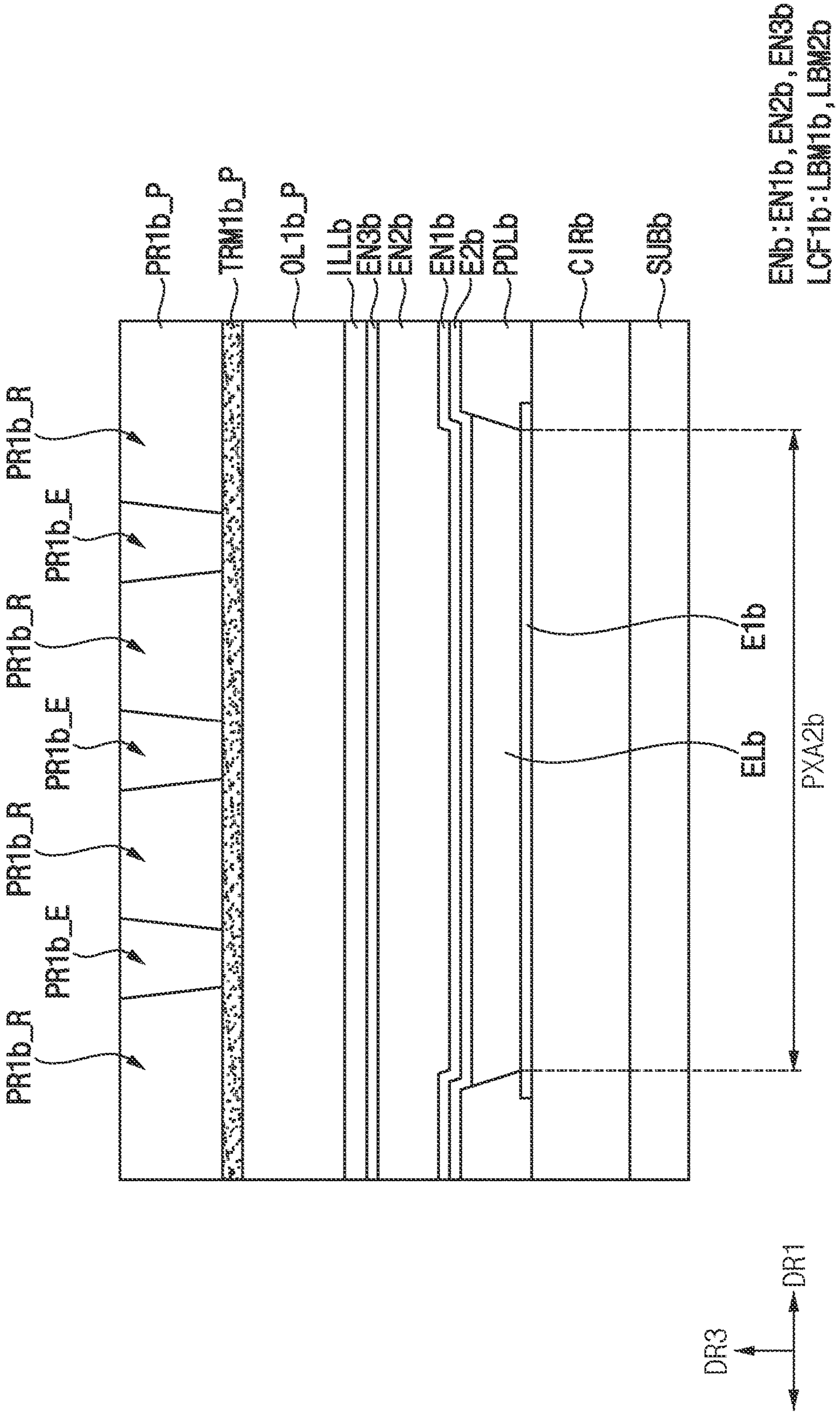
FIG. 15 to FIG. 29 are diagrams illustrating a method of manufacturing the display device of FIG. 13.

Referring to FIG. 15, a first preliminary organic layer OL1*b*_P may be formed on the etch protection layer ILLb. The first preliminary organic layer OL1*b*_P may have substantially the same material as the material included in the first organic layer OL1*b* described with reference to FIG. 14. For example, the first preliminary organic layer OL1*b*_P may include siloxane-based material and/or silica-based material. In this case, because the first preliminary organic layer OL1*b*_P includes siloxane-based material and/or silica-based material, the first preliminary organic layer OL1*b*_P may have improved light transmittance.

After forming the first preliminary organic layer OL1*b*_P, a first preliminary transparent layer TRM1*b*_P may be formed on the first preliminary organic layer OL1*b*_P. The first preliminary transparent layer TRM1*b*_P may include a transparent conductive material. For example, the first preliminary transparent layer TRM1*b*_P may include metal oxide (for example, ITO, etc.). For another example, the first preliminary transparent layer TRM1*b*_P may include metal (for example, aluminum, etc.).

After forming the first preliminary transparent layer TRM1*b*_P, a first preliminary photoresist layer PR1*b*_P may be formed on the first preliminary transparent layer TRM1*b*_P. The first preliminary photoresist layer PR1*b*_P may include photosensitive material.

After forming the first preliminary photoresist layer PR1*b*_P, a portion of the first preliminary photoresist layer PR1*b*_P may be exposed to light. In one or more embodiments, when the first preliminary photoresist layer PR1*b*_P includes a positive type photoresist material, an elimination portion PR1*b*_E of the first preliminary photoresist layer PR1*b*_P may be exposed to light, and a remaining portion PR1*b*_R of the first preliminary photoresist layer PR1*b*_P may not be exposed to light. In one or more other embodiments, when the first preliminary photoresist layer PR1*b*_P includes a negative type photoresist material, the elimination portion PR1*b*_E of the first preliminary photoresist layer PR1*b*_P may not be exposed to light, and the remaining portion PR1*b*_R of the first preliminary photoresist layer PR1*b*_P may be exposed to light.

Figure 16:
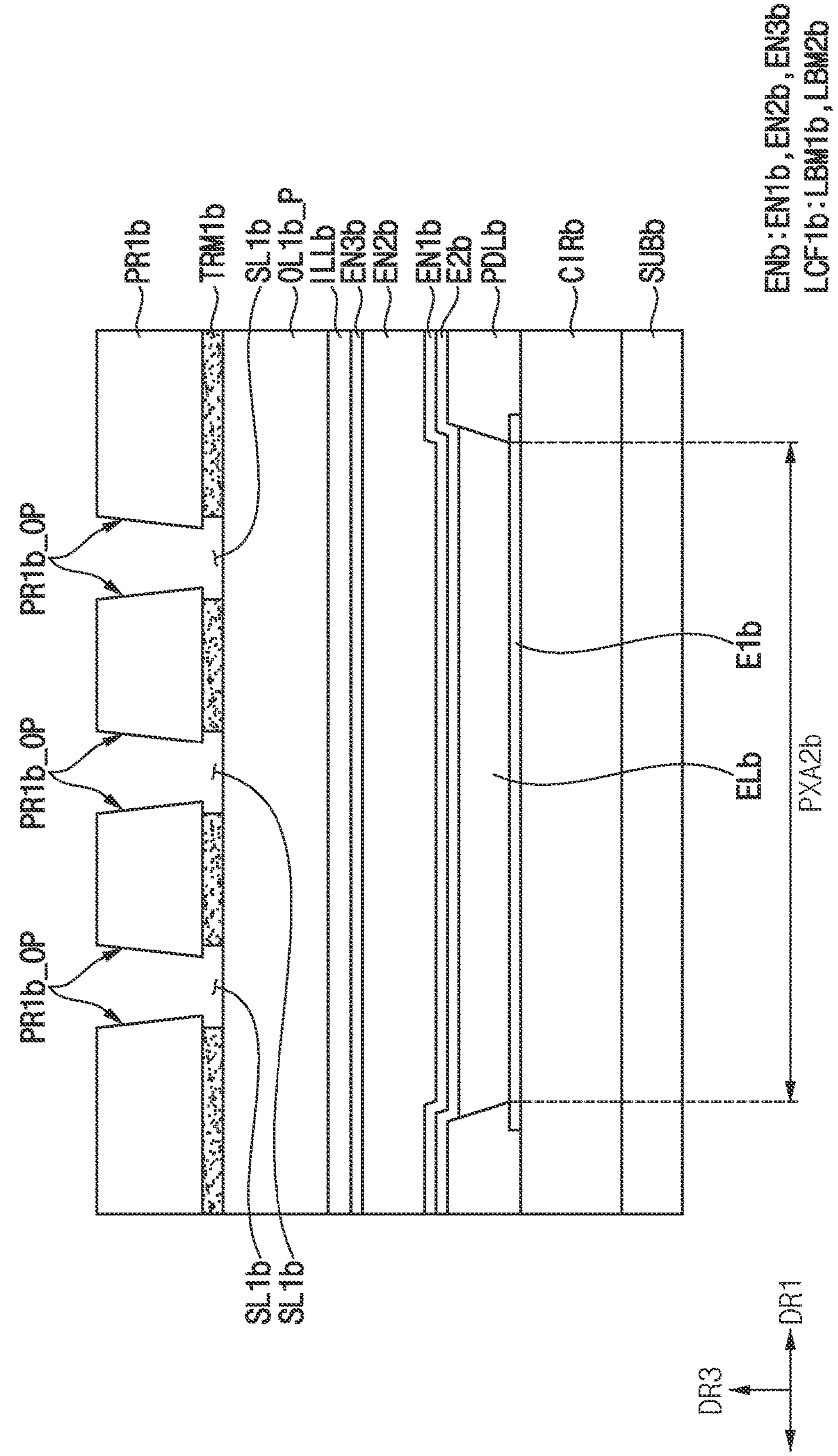

Referring to FIG. 16, after exposing the portion of the first preliminary photoresist layer PR1*b*_P, the elimination portion PR1*b*_E of the first preliminary photoresist layer PR1*b*_P may be developed. Accordingly, the elimination portion PR1*b*_E of the first preliminary photoresist layer PR1*b*_P may be removed, and the remaining portion PR1*b*_R of the first preliminary photoresist layer PR1*b*_P may form the first photoresist layer PR1*b*. In this case, a first opening PR1*b*_OP corresponding to the elimination portion PR1*b*_E of the first preliminary photoresist layer PR1*b*_P may be defined in the first photoresist layer PR1*b*. In this case, by the first opening PR1*b*_OP, a portion of an upper surface of the first preliminary transparent layer TRM1*b*_P described with reference to FIG. 15 may be exposed.

The first photoresist layer PR1*b* formed by exposing and developing the first preliminary photoresist layer PR1*b*_P may have a positively tapered sides in a cross-sectional view. In other words, the first photoresist layer PR1*b* may have a trapezoidal shape in a cross-sectional view, and an upper side of the trapezoidal shape may be shorter than a lower side of the trapezoidal shape.

After forming the first photoresist layer PR1*b*, the first transparent layer TRM1*b*_P may be etched using the first photoresist layer PR1*b* as a mask. Accordingly, a portion of the first preliminary transparent layer TRM1*b*_P corresponding to the first opening PR1*b*_OP may be removed, and the first transparent layer TRM1*b* defining a first slit pattern SL1*b* may be formed. In this case, by the first slit pattern SL1*b*, a portion of an upper surface of the first preliminary organic layer OL1*b*_P may be exposed.

In one or more embodiments, when the first preliminary transparent layer TRM1*b*_P includes metal oxide (for example, ITO, etc.), the portion of the first preliminary transparent layer TRM1*b*_P may be removed by wet-etching. In one or more other embodiments, when the first preliminary transparent layer TRM1*b*_P includes metal (for example, aluminum, etc.), the portion of the first preliminary transparent layer TRM1*b*_P may be removed by dry-etching. In this case, in the above-described embodiments, a width of the first slit pattern SL1*b* (e.g., in the first direction DR1) may be larger than a width of the first opening PR1*b*_OP adjacent to the first slit pattern SL1*b*. That is, an undercut space (e.g., refer to UCA1 of FIG. 19) not contacting the first transparent layer TRM1*b* may be formed at a lower surface of the first photoresist layer PR1*b*.

Figure 17:
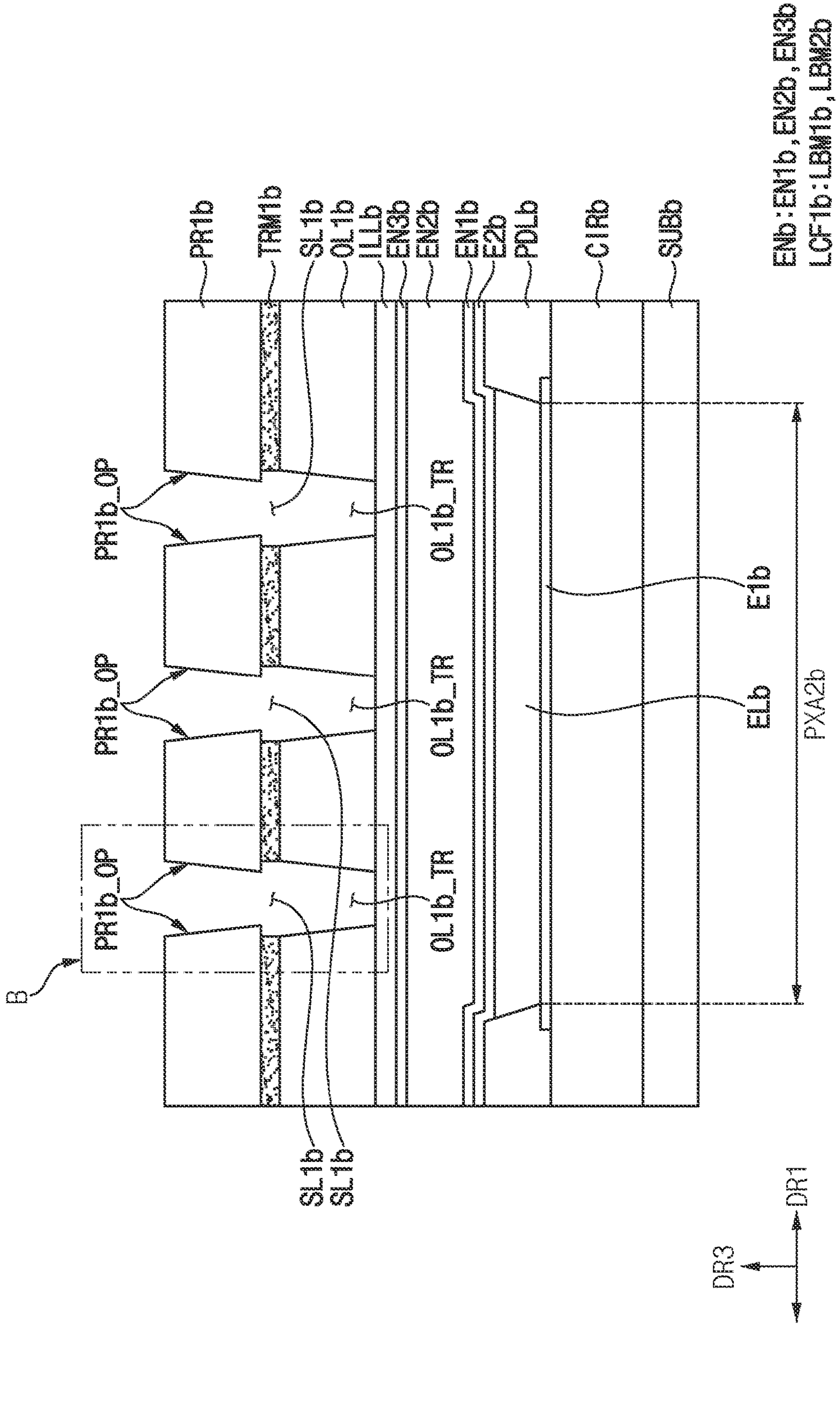

Referring to FIG. 17, the first organic layer OL1*b* may be formed by removing a portion of the first preliminary organic layer OL1*b*_P. For example, the portion of the first preliminary organic layer OL1*b*_P may be dry-etched using the first transparent layer TRM1*b* and the first photoresist layer PR1*b* as a mask. In this case, the first organic layer OL1*b* may define a first trench or groove OL1*b*_TR corresponding to the portion of the first preliminary organic layer OL1*b*_P, and exposing at least a portion of the etch protection layer ILLb.

Figure 18:
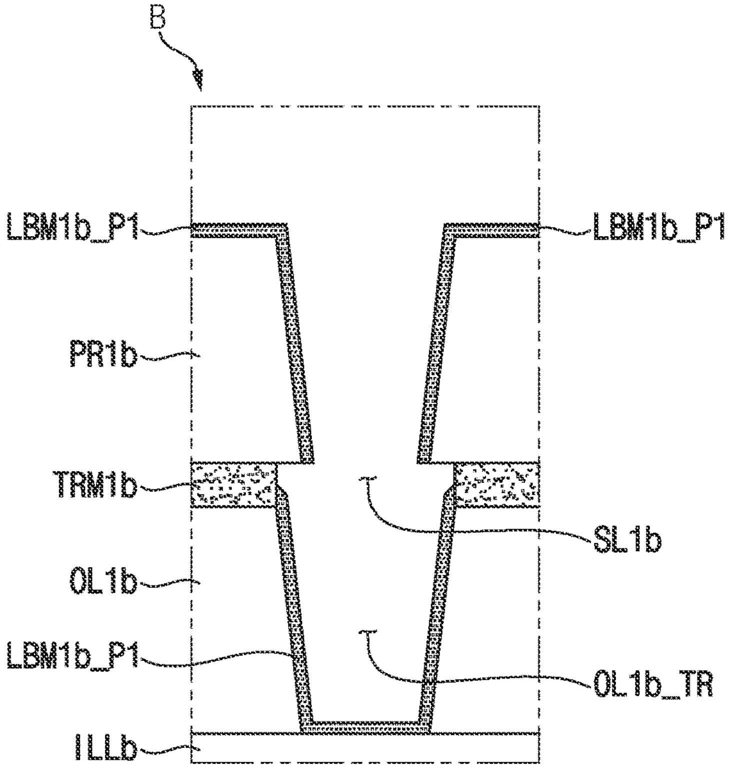

Referring to FIG. 18, the first light-blocking material may be deposited to cover an upper surface and a side surface of the first photoresist layer PR1*b*, at least a portion of a side surface of the first transparent layer TRM1*b*, and a side surface of the first organic layer OL1*b* defining the first trench or groove OL1*b*_TR. The first light-blocking material may include metal (or metal oxide) having a relatively low reflectance.

In this case, after a relatively short time elapses after the start of the deposition of the first light-blocking material, the first light-blocking material may form a first deposition portion LBM1*b*_P1. The first deposition portion LBM1*b*_P1 may cover the upper surface and the side surface of the first photoresist layer PR1*b*, a portion of the side surface of the first transparent layer TRM1*b*, the first trench or groove OL1*b*_TR formed in the first organic layer OL1*b*, and the etch protection layer ILLb exposed by the first trench or groove OL1*b*_TR. In this case, the first deposition portion LBM1*b*_P1 may have a thickness that is relatively uniform and relatively thin.

Figure 19:
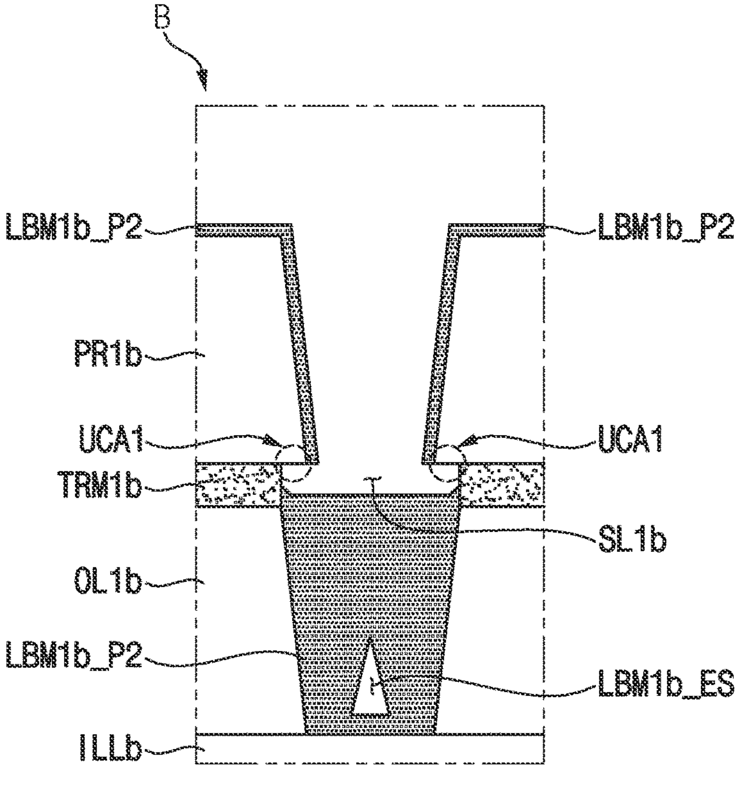

Referring to FIG. 19, after a relatively long time elapses after the start of the deposition of the first light-blocking material, the first light-blocking material may form a second deposition portion LBM1*b*_P2. In this case, the second deposition portion LBM1*b*_P2 may fill most of the first trench or groove OL1*b*_TR.

For example, the second deposition portion LBM1*b*_P2 may fill an upper portion of the first trench or groove OL1*b*_TR, and may fill a portion of a lower portion of the first trench or groove OL1*b*_TR adjacent to the upper portion of the first trench or groove OL1*b*_TR. In this case, the second deposition portion LBM1*b*_P2 may define a space, or inner space, LBM1*b*_ES defined at the lower portion of the first trench or groove OL1*b*_TR and not filled with the first light-blocking material. The space/inner space LBM1*b*_ES may be formed by depositing more of the first light-blocking material at the upper portion of the first trench or groove OL1*b*_TR than at the lower portion of the first trench or groove OL1*b*_TR as the deposition of the first light-blocking material proceeds. The space LBM1*b*_ES may be surrounded only by the first light-blocking material.

The first light-blocking material may not be deposited at an undercut space UCA1. The undercut space UCA1 may be defined as a space in which the lower surface of the first photoresist layer PR1*b* does not substantially contact the first transparent layer TRM1*b*. The undercut space UCA1 may be formed by adjusting etching conditions of the first preliminary transparent layer TRM1*b*_P. That is, the undercut space UCA1 may be formed by forming the width of the first silt pattern SL1*b* (e.g., in the first direction DR1) to be larger than the width of the first opening PR1*b*_OP adjacent to the first silt pattern SL1*b*. As the undercut space UCA1 is formed, the first light-blocking material covering the side surface of the first photoresist layer PR1*b* may be spaced apart from the first light-blocking material covering the portion of the side surface of the first transparent layer TRM1*b*.

Figure 20:
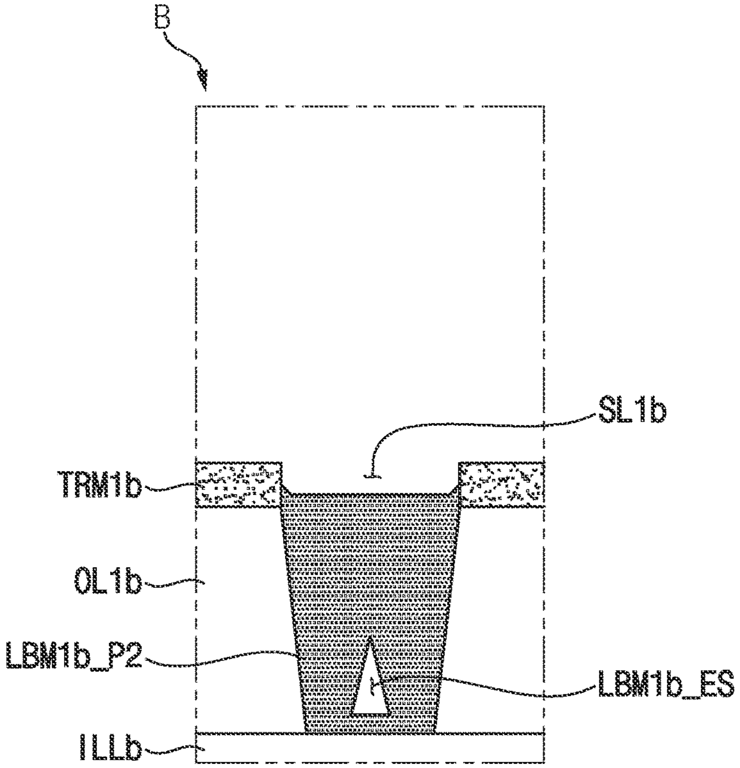

Referring to FIG. 20, the first photoresist layer PR1*b* may be removed by lifting-off the first photoresist layer PR1*b*. For example, the first photoresist layer PR1*b* may be removed by penetrating a developer into an interface between the first photoresist layer PR1*b* and the first transparent layer TRM1*b* through the undercut space UCA1 not covered by the first light-blocking material.

As the first photoresist layer PR1*b* is removed, the first light-blocking material covering the upper surface and the side surface of the first photoresist layer PR1*b* may also be removed.

Figure 21:
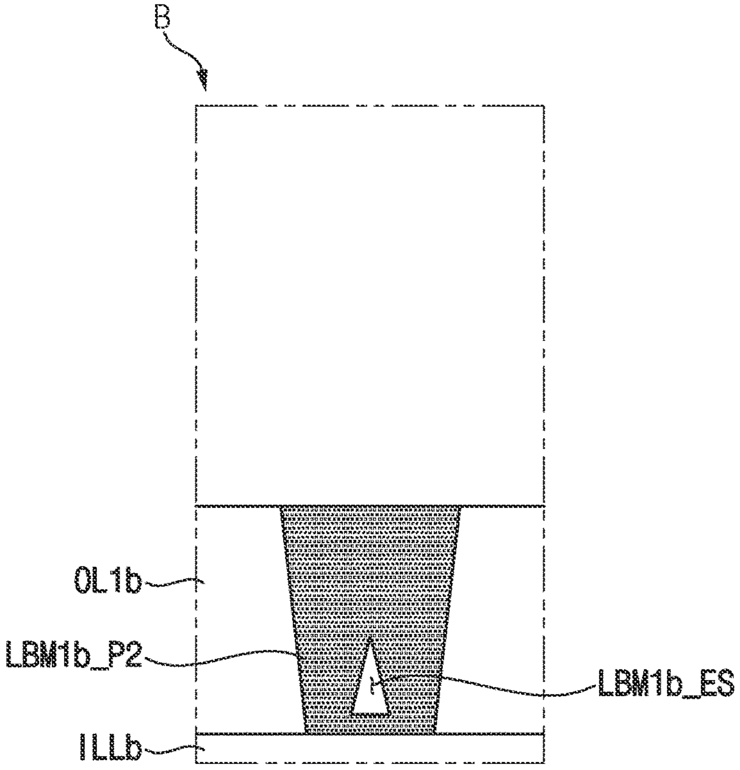
Figure 22:
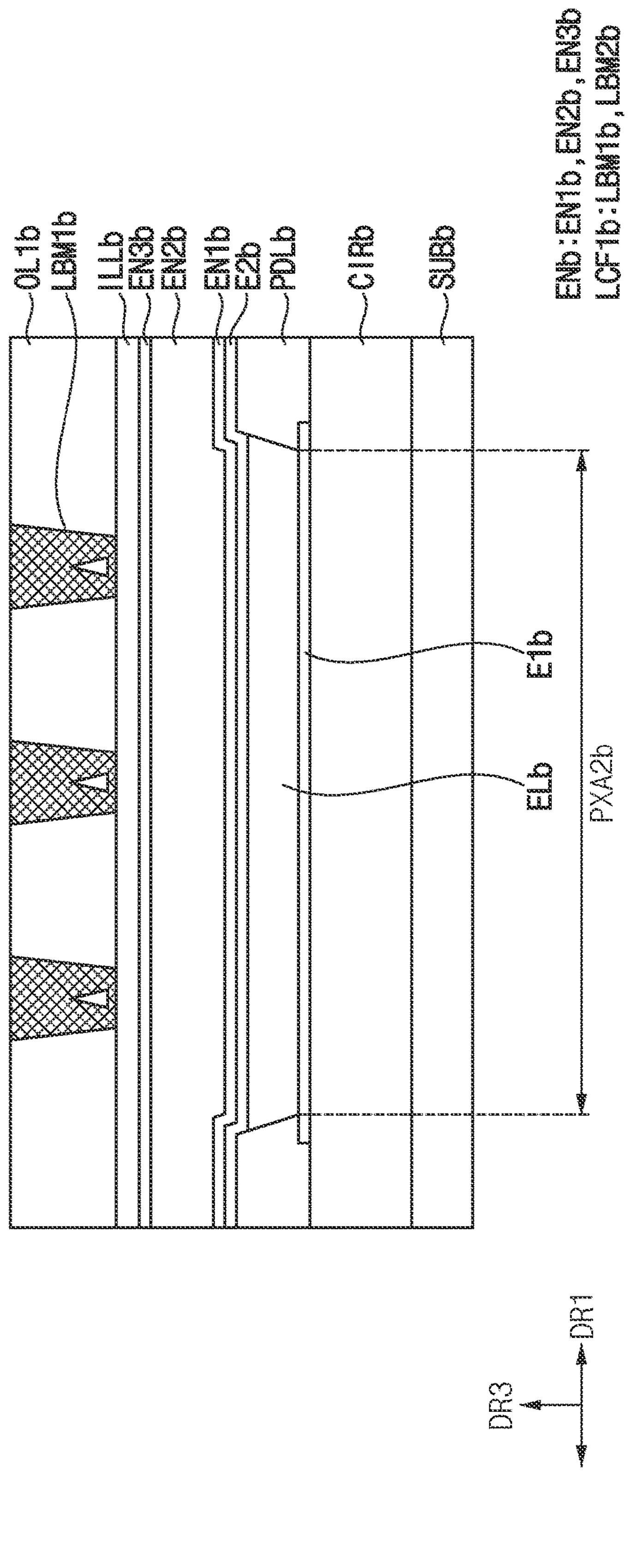

Referring to FIG. 21 and FIG. 22, the first light-blocking pattern LBM1*b* may be formed by removing a portion of the first light-blocking material and the first transparent layer TRM1*b* positioned at a higher level than the upper surface of the first organic layer OL1*b*. Accordingly, a level of the upper surface of the first light-blocking pattern LBM1*b* may be substantially the same as a level of the upper surface of the first organic layer OL1*b*. The first light-blocking pattern LBM1*b* may directly contact the side surface of the first organic layer OL1*b* defining the first trench or groove OL1*b*_TR and the upper surface of the etch protection layer ILLb exposed by the first trench or groove OL1*b*_TR.

FIG. 23, FIG. 24, FIG. 25, FIG. 26, FIG. 27, FIG. 28, and FIG. 29 are diagrams illustrating a method of forming the second organic layer OL2*b* and the second light-blocking pattern LBM2*b*.

Figure 23:
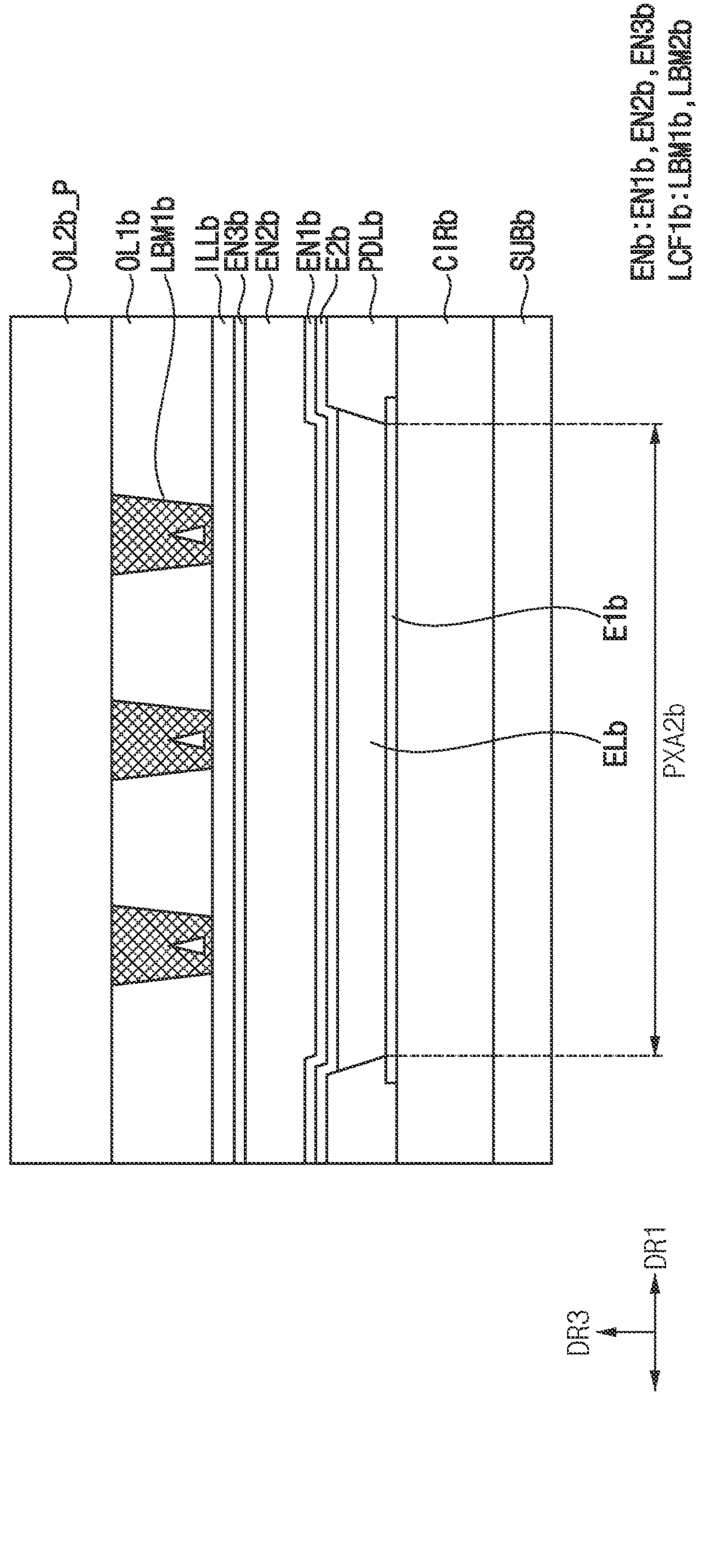

Referring to FIG. 23, a second preliminary organic layer OL2*b*_P may be formed on the first organic layer OL1*b*. Materials included in the second preliminary organic layer OL2*b*_P may be substantially the same as materials included in the second organic layer OL2*b* described with reference to FIG. 14. For example, the second preliminary organic layer OL2*b*_P may include siloxane-based material and/or silica-based material. In this case, because as the second preliminary organic layer OL2*b*_P includes the siloxane-based material and/or the silica-based material, the second preliminary organic layer OL2*b*_P may have improved light transmittance.

Figure 24:
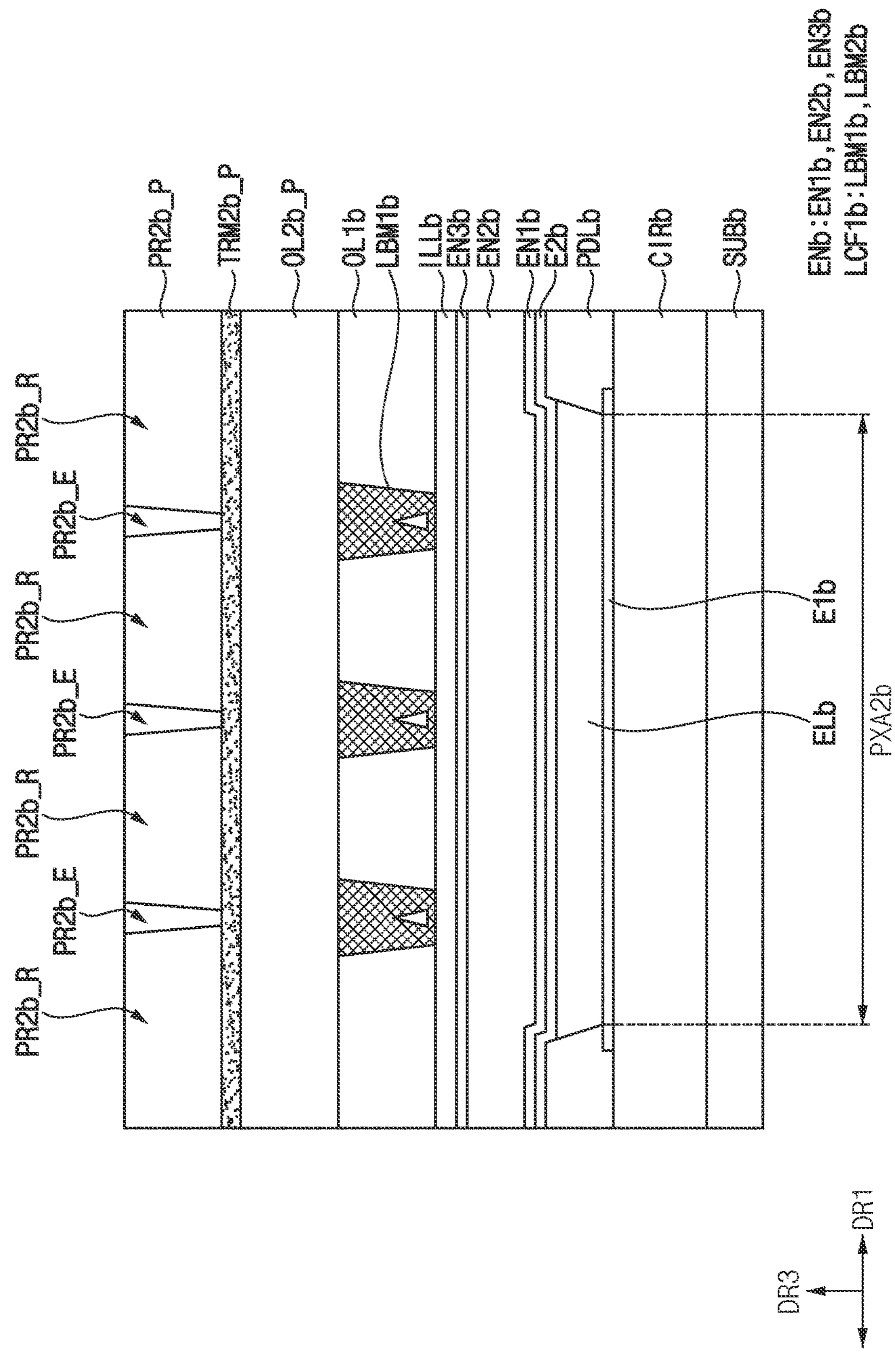

Referring to FIG. 24, after forming the second preliminary organic layer OL2*b*_P, a second preliminary transparent layer TRM2*b*_P may be formed on the second organic layer OL2*b*_P. The second preliminary transparent layer TRM2*b*_P may include a transparent conductive material. For example, the second preliminary transparent layer TRM2*b*_P may include metal oxide (for example, ITO, etc.). For another example, the second preliminary transparent layer TRM2*b*_P may include metal (for example, aluminum, etc.).

After forming the second preliminary transparent layer TRM2*b*_P, a second preliminary photoresist layer PR2*b*_P may be formed on the second preliminary transparent layer TRM2*b*_P. The second preliminary photoresist layer PR2*b*_P may include a photosensitive material.

After forming the second preliminary photoresist layer PR2*b*_P, a portion of the second preliminary photoresist layer PR2*b*_P may be exposed to light. In one or more embodiments, when the second preliminary photoresist layer PR2*b*_P includes positive type photoresist material, an elimination portion PR2*b*_E of the second preliminary photoresist layer PR2*b*_P may be exposed to light, and a remaining portion PR2*b*_R of the second preliminary photoresist layer PR2*b*_P may not be exposed to light. In one or more other embodiments, when the second preliminary photoresist layer PR2*b*_P includes negative type photoresist material, the elimination portion PR2*b*_E of the second preliminary photoresist layer PR2*b*_P may not be exposed to light, and the remaining portion PR2*b*_R of the second preliminary photoresist layer PR2*b*_P may be exposed to light.

Figure 25:
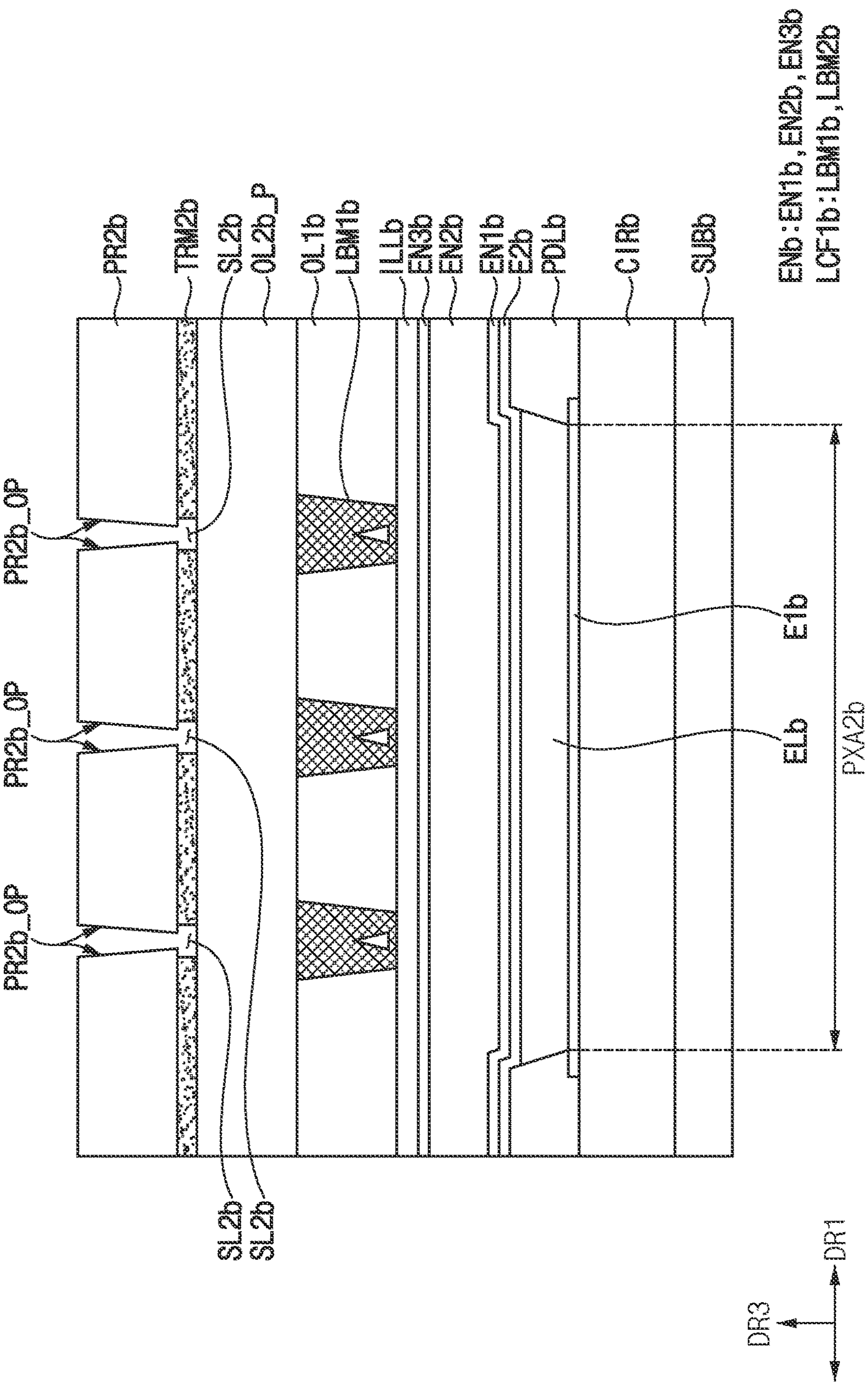

Referring to FIG. 25, after exposing the portion of the second preliminary photoresist layer PR2*b*_P, the elimination portion PR2*b*_E of the second preliminary photoresist layer PR2*b*_P may be developed. Accordingly, the elimination portion PR2*b*_E of the second preliminary photoresist layer PR2*b*_P may be removed, and the remaining portion PR2*b*_R of the second preliminary photoresist layer PR2*b*_P may form the second photoresist layer PR2*b*. In this case, a second opening PR2*b*_OP corresponding to the elimination portion PR2*b*_E of the second preliminary photoresist layer PR2*b*_P may be defined in the second photoresist layer PR2*b*. In this case, a portion of an upper surface of the second preliminary transparent layer TRM2*b*_P described with reference to FIG. 24 may be exposed by the second opening PR2*b*_OP.

The second photoresist layer PR2*b* formed by exposing and developing of the second preliminary photoresist layer PR2*b*_P may have a positively tapered sides in a cross-sectional view. In other words, the second photoresist layer PR2*b* may have a trapezoidal shape in a cross-sectional view, and an upper side of the trapezoidal shape may be shorter than a lower side of the trapezoidal shape.

After forming the second photoresist layer PR2*b*, the second preliminary transparent layer TRM2*b*_P may be etched using the second photoresist layer PR2*b* as a mask. Accordingly, a portion of the second preliminary transparent layer TRM2*b*_P corresponding to the second opening PR2*b*_OP may be removed, and the second transparent layer TRM2*b* defining a second slit pattern SL2*b* may be formed. In this case, via the second slit pattern SL2*b*, a portion of an upper surface of the second preliminary organic layer OL2*b*_P may be exposed.

In one or more embodiments, when the second preliminary transparent layer TRM2*b*_P includes metal oxide (for example, ITO, etc.), the portion of the second preliminary transparent layer TRM2*b*_P may be removed by wet-etching. In one or more other embodiments, when the second preliminary transparent layer TRM2*b*_P includes metal (for example, aluminum, etc.), the portion of the second preliminary transparent layer TRM2*b*_P may be removed by dry-etching. In this case, in the above-described embodiments, a width of the second slit pattern SL2*b* (e.g., in the first direction DR1) may be larger than a width of the second opening PR2*b*_OP adjacent to the second slit pattern SL2*b*. That is, an undercut space not contacting the second transparent layer TRM2*b* may be formed at a lower surface of the second photoresist layer PR2*b*.

Figure 26:
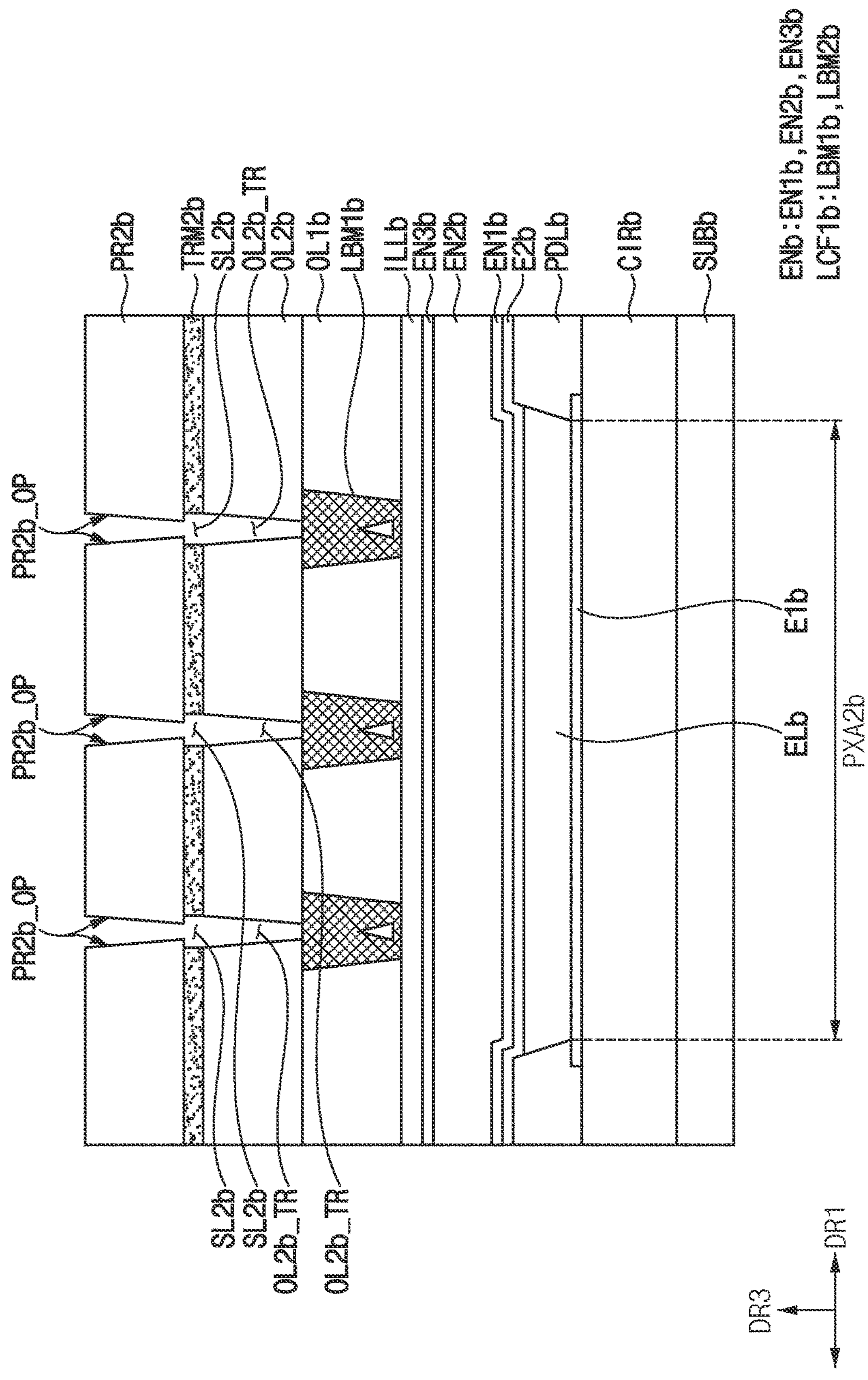

Referring to FIG. 26, the second organic layer OL2*b* may be formed by removing a portion of the second preliminary organic layer OL2*b*_P. For example, the portion of the second preliminary organic layer OL2*b*_P may be dry-etched using the second transparent layer TRM2*b* and the second photoresist layer PR2*b* as a mask. In this case, the second organic layer OL2*b* may define a second trench or groove OL2*b*_TR corresponding the portion of the second preliminary organic layer OL2*b*_P, and exposing at least a portion of the first light-blocking pattern LBM1*b*.

Figure 27:
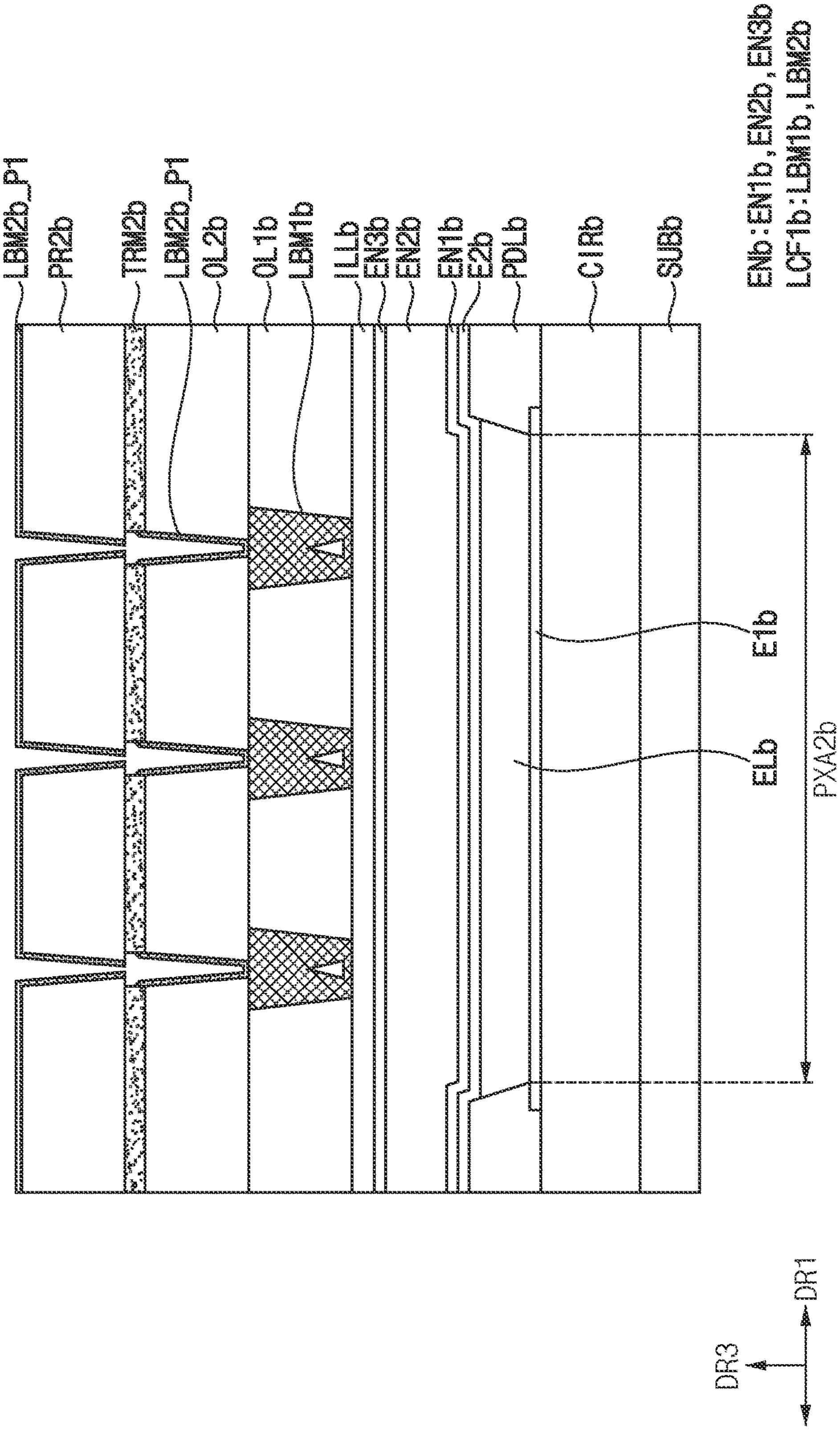

Referring to FIG. 27, the second light-blocking material may be deposited to cover an upper surface and a side surface of the second photoresist layer PR2*b*, at least a portion of a side surface of the second transparent layer TRM2*b*, and a side surface of the second organic layer OL2*b* defining the second trench or groove OL2*b*_TR. The second light-blocking material may include metal (or metal oxide) having a relatively low reflectance.

In this case, after a relatively short time elapses after the start of the deposition of the second light-blocking material, second light-blocking material may form a first deposition portion LBM2*b*_P1. The first deposition portion LBM2*b*_P1 may cover the upper surface and the side surface of the second photoresist layer PR2*b*, a portion of the side surface of the second transparent layer TRM2*b*, the second trench or groove OL2*b*_TR formed in the second organic layer OL2*b*, and the first light-blocking pattern LBM1*b* exposed by the second trench or groove OL2*b*_TR. In this case, the first deposition portion LBM2*b*_P1 may have a relatively uniform and relatively small thickness.

Figure 28:
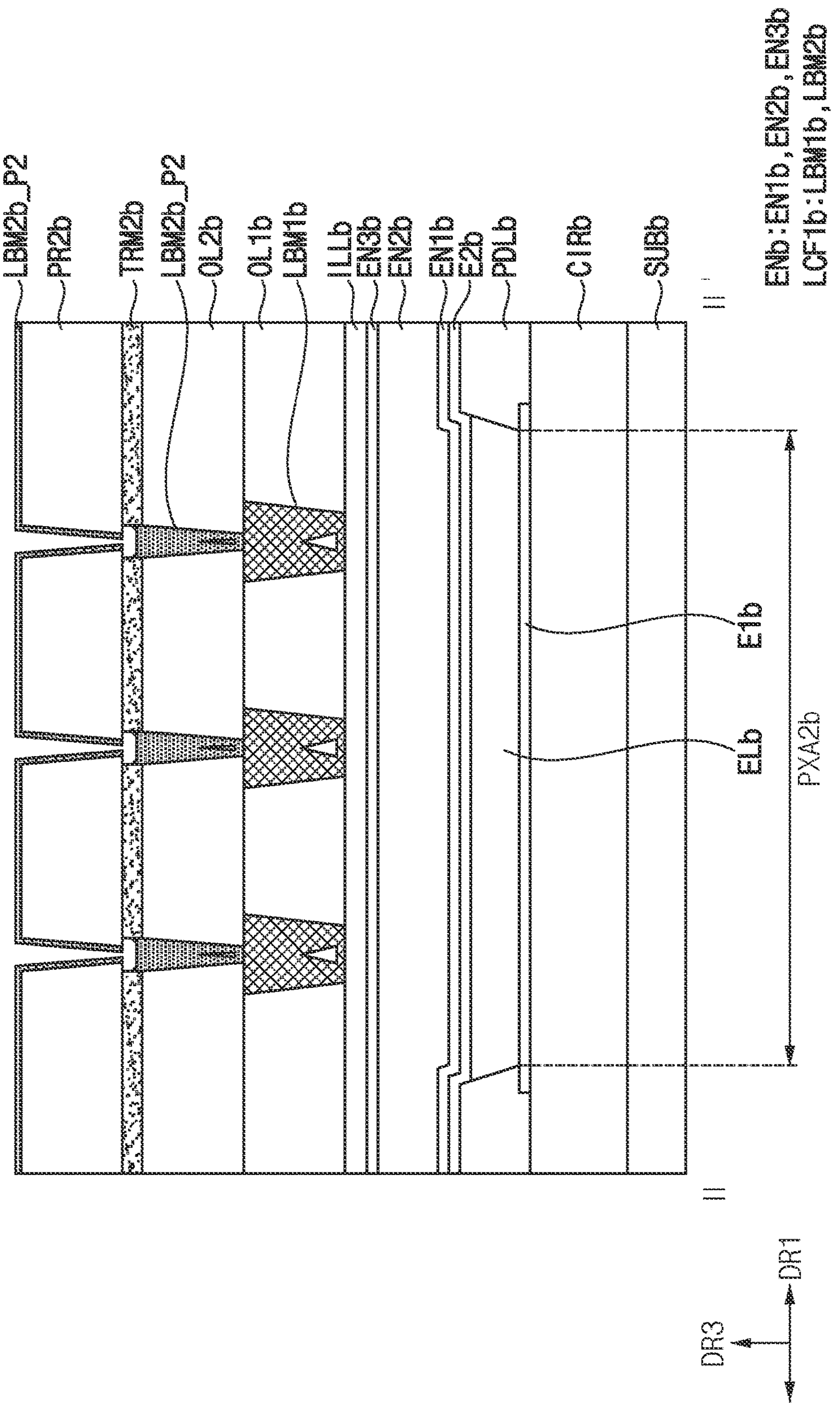

Referring to FIG. 28, after a relatively long time elapses after the start of the deposition of the second light-blocking material, the second light-blocking material may form a second deposition portion LBM2*b*_P2. In this case, the second deposition portion LBM2*b*_P2 may fill most of the second trench or groove OL2*b*_TR.

For example, the second deposition portion LBM2*b*_P2 may fill an upper portion of the second trench or groove OL2*b*_TR, and may fill a portion of a lower portion of the second trench or groove OL2*b*_TR adjacent to the upper portion of the second trench or groove OL2*b*_TR. In this case, the second deposition portion LBM2*b*_P2 may define a space defined at the lower portion of the second trench or groove OL2*b*_TR and not filled with the second light-blocking material. The space may be surrounded only by the second light-blocking material.

The second light-blocking material may not be deposited at an undercut space defined as a space in which the lower surface of the second photoresist layer PR2*b* does not contact the second transparent layer TRM2*b*.

Figure 29:
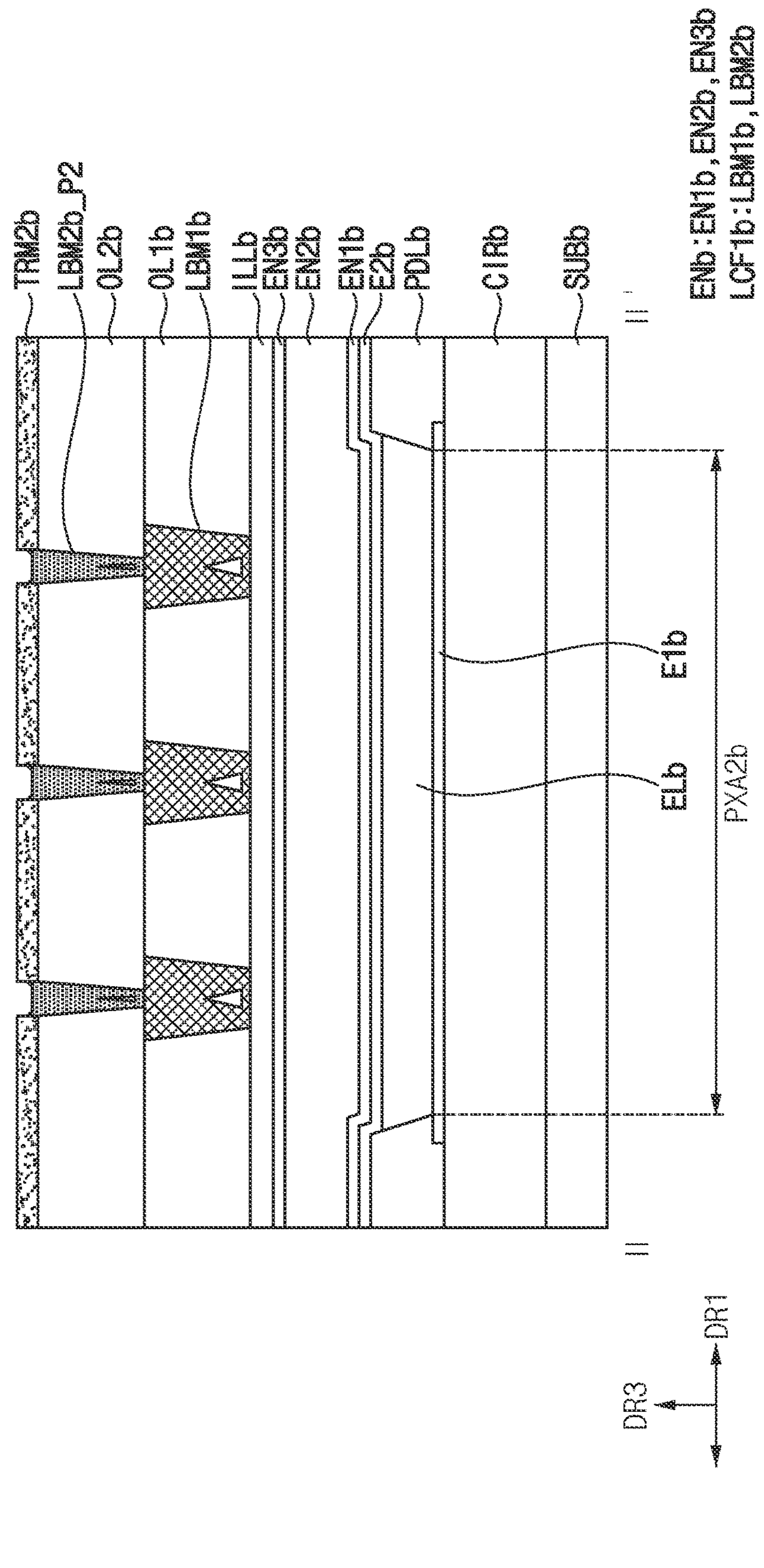

Referring to FIG. 29, the second photoresist layer PR2*b* may be removed by lifting off the second photoresist layer PR2*b*. For example, the second photoresist layer PR2*b* may be removed by penetrating a developer into an interface between the second photoresist layer PR2*b* and the second transparent layer TRM2*b* through the undercut space not covered by the second light-blocking material.

As the second photoresist layer PR2*b* is removed, the second light-blocking material covering the upper surface and the side surface of the second photoresist layer PR2*b* may also be removed.

In one or more embodiments, after removing the second photoresist layer PR2*b*, the second light-blocking pattern LBM2*b* may be formed by removing a portion of the second light-blocking material and the second transparent layer TRM2*b* that is positioned at a higher level than the upper surface of the second organic layer OL2*b*. Accordingly, a level of the upper surface of the second light-blocking pattern LBM2*b* may be substantially the same as a level of the upper surface of the second organic layer OL2*b*. The second light-blocking pattern LBM2*b* may directly contact the side surface of the second organic layer OL2*b* defining the second trench or groove OL2*b*_TR and the upper surface of the first light-blocking pattern LBM1*b* exposed by the second trench or groove OL2*b*_TR.

Figure 30:
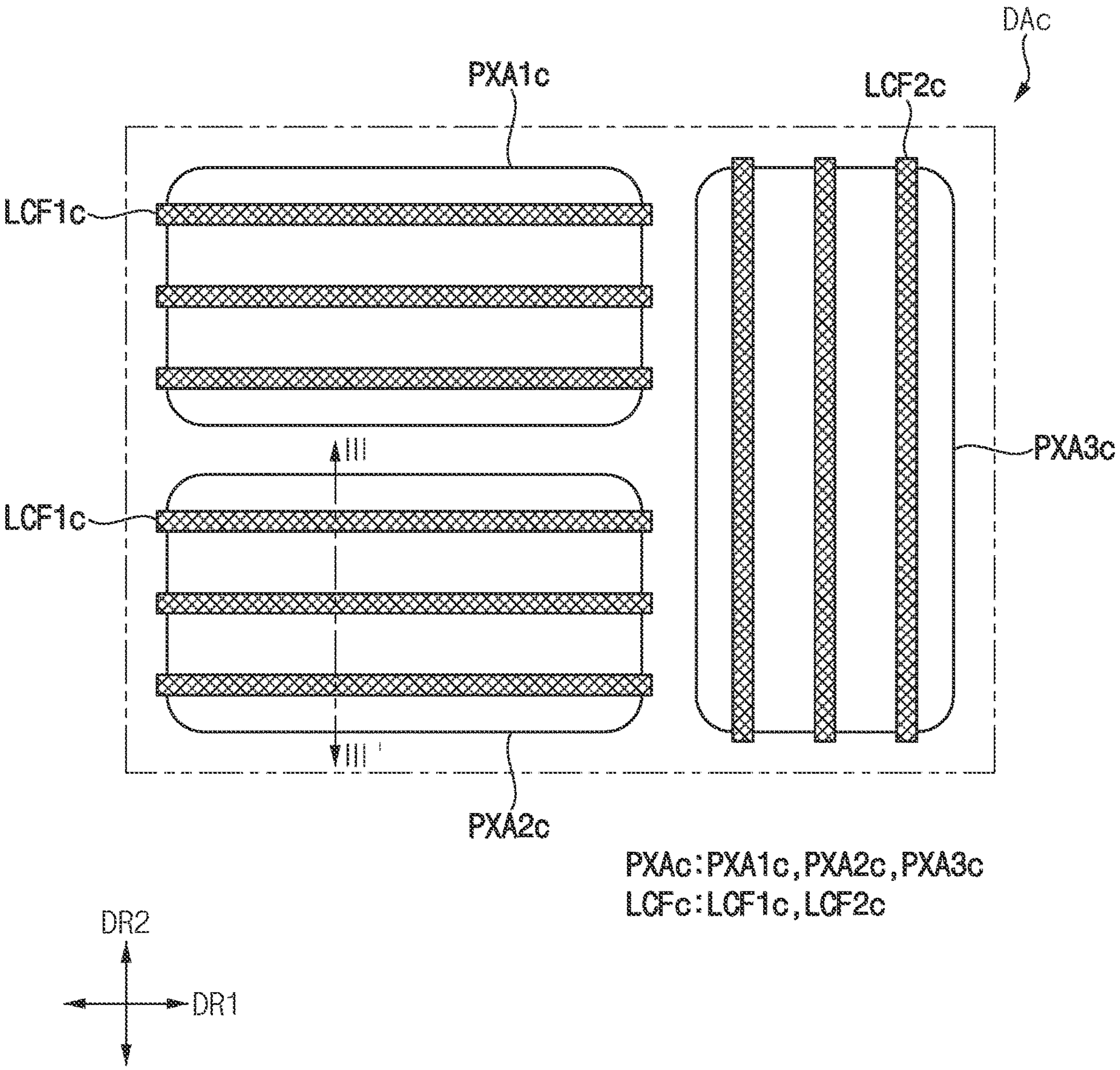
FIG. 30 is a plan view illustrating a display area of a display device according to still one or more other embodiments.

FIG. 30 is a plan view illustrating a display area of a display device according to still one or more other embodiments.

Referring to FIG. 30, a display device according to still one or more other embodiments may include a display area DAc. The display area DAc may be a portion of an area in which an image is displayed.

The display area DAc may include a pixel area PXAc including first to third pixel areas PXA1*c*, PXA2*c*, and PXA3*c*. The pixel area PXAc may be substantially the same as the pixel area PXAa described with reference to FIG. 1. Accordingly repetitive description of the pixel area PXAc will be omitted.

The display device may include a light-blocking element LCFc limiting a viewing angle of light emitted from the pixel area PXAc. The light-blocking element LCFc may include first light-blocking elements LCF1*c* and second light-blocking elements LCF2*c*. Shapes and arrangements of the light-blocking element LCFc in a plan view may be substantially the same as the shapes and the arrangements of the light-blocking element LCFa in a plan view described with reference to FIG. 1. Accordingly, hereinafter, a cross-sectional structure of the light-blocking element LCFb may be described.

Figure 31:
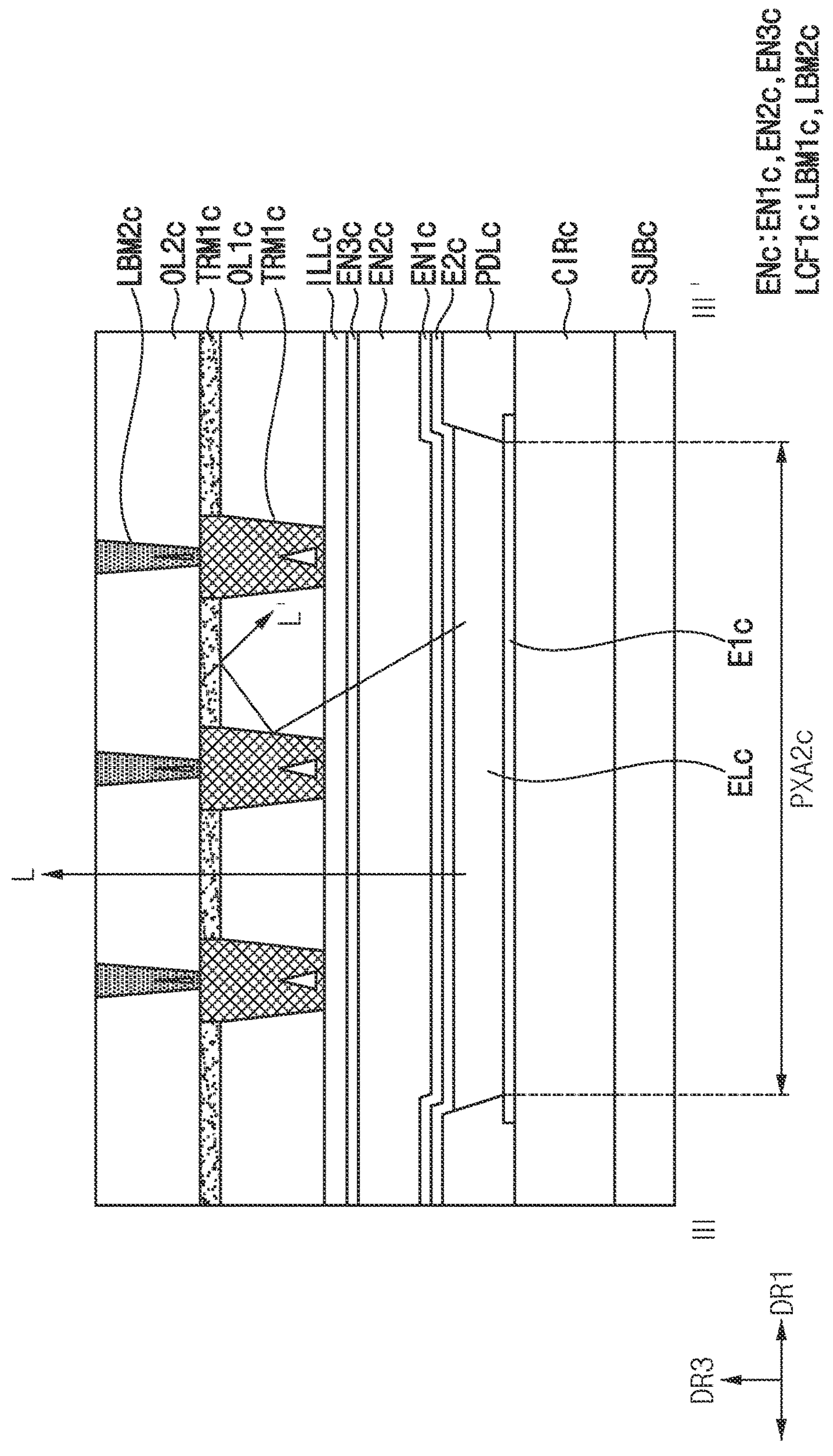
FIG. 31 is a cross-sectional view taken along the line III-III' of FIG. 30.

FIG. 31 is a cross-sectional view taken along the line III-III' of FIG. 30.

Referring to FIG. 31, the display device according to still one or more other embodiments may include a substrate SUBc, a circuit layer CIRc, a first electrode E1*c*, a pixel-defining layer PDLc, a light-emitting element ELc, a second electrode E2*c*, an encapsulation layer ENc, an etch protection layer ILLc, a first organic layer OL1*c*, a second organic layer OL2*c*, a first transparent layer TRM1*c*, and a first light-blocking element LCF1*c*.

The substrate SUBc, the circuit layer CIRc, the first electrode E1*c*, the pixel-defining layer PDLc, the light-emitting element ELc, the second electrode E2*c*, the encapsulation layer ENc, and the etch protection layer ILLc may be respectively substantially the same as the substrate SUBa, the circuit layer CIRa, the first electrode E1*a*, the pixel-defining layer PDLa, the light-emitting element ELa, the second electrode E2*a*, the encapsulation layer ENa, and the etch protection layer ILLa described with reference to FIG. 2.

The first organic layer OL1*c* may be located on the etch protection layer ILLc, and the second organic layer OL2*c* may be located on the first organic layer OL1*c*. Each of the first organic layer OL1*c* and the second organic layer OL2*c* may include an organic insulation material having a relatively large light transmittance. For example, each of the first organic layer OL1*c* and the second organic layer OL2*c* may include siloxane-based material and/or silica-based material.

In one or more embodiments, to improve emission efficiency of light emitted from the light-emitting material ELc, a refractive index of the first organic layer OL1*c* may be different from a refractive index of the second organic layer OL2*c*. For example, when the first organic layer OL1*c* and the second organic layer OL2*c* include substantially the same materials, a content ratio of the materials in the first organic layer OL1*c* may be different from a content ratio of the materials in the second organic layer OL2*c*.

The first transparent layer TRM1*c* may be located between the first organic layer OL1*c* and the second organic layer OL2*c*. The first transparent layer TRM1*c* may include a transparent conductive material. For example, the first transparent layer TRM1*c* may include metal oxide (for example, ITO, etc.). For another example, the first transparent layer TRM1*c* may include metal (for example, aluminum, etc.).

The first transparent layer TRM1*c* may serve to limit a viewing angle of light emitted from the light-emitting material ELc. For example, when light L traveling substantially in the third direction DR3 is emitted from the light-emitting material ELc, the light L may pass through the first organic layer OL1*c*, the first transparent layer TRM1*c*, and the second organic layer OL2*c* to be recognized by the user. In this case, because the light L travels in substantially the same direction as the third direction DR3, the light L may have a relatively narrow viewing angle. Conversely, when light L' is emitted from the light-emitting material ELc in a direction crossing the third direction DR3 and has a relatively wide viewing angle, the light L' may be reflected at an interface between the first organic layer OL1*c* and the first light-blocking pattern LBM1*c*. In this case, the first transparent layer TRM1*c* may reflect the light L' reflected from the interface again, so that the light L' having a relatively wide viewing angle may not be recognized by the user.

The first light-blocking elements LCF1*c* may be located on the etch protection layer ILLc. Each of the first light-blocking elements LCF1*c* may be located in a trench or groove formed in the first organic layer OL1*c* and the second organic layer OL2*c* and a first slit pattern formed in the first transparent layer TRM1*c*. The first light-blocking elements LCF1*c* may extend in the third direction DR3.

Each of the first light-blocking elements LCF1*c* may include a first light-blocking pattern LBM1*c* and a second light-blocking pattern LBM2*c*. The first light-blocking pattern LBM1*c* may be located in a first trench or groove (e.g., refer to OL1*c*_TR of FIG. 34) formed in the first organic layer OL1*c*, and a first slit pattern (e.g., refer to SL1*c* of FIG. 33) formed in the first transparent layer TRM1*c*. The second light-blocking pattern LBM2*c* may be located in a second trench or groove (e.g., refer to OL2*c*_TR of FIG. 40) formed in the second organic layer OL2*c*. In this case, the second light-blocking pattern LBM2*c* may contact an upper surface of the first light-blocking pattern LBM1*c*.

Each of the first light-blocking pattern LBM1*c* and the second light-blocking pattern LBM2*c* may include a material having a relatively low reflectance. For example, each of the first light-blocking pattern LBM1*c* and the second light-blocking pattern LBM2*c* may include a metal (or metal oxide) having a relatively low reflectance.

In one or more embodiments, the first light-blocking pattern LBM1*c* may be formed by depositing a first light-blocking material, and accordingly, the first light-blocking pattern LBM1*c* may define a space/inner space (for example, LBM1*c*_ES of FIG. 37) not filled with the first light-blocking material. The space not filled with the first light-blocking material will be described later with reference to FIG. 37.

In one or more embodiments, the second light-blocking pattern LBM2*c* may be formed by depositing a second light-blocking material, and accordingly, the second light-blocking pattern LBM2*c* may define a space not filled with the second light-blocking material.

In FIG. 31, one or more embodiments in which a width of the first light-blocking pattern LBM1*c* (e.g., in the first direction DR1) is larger than a width of the second light-blocking pattern LBM2*c* (e.g., in the first direction DR1) has been shown, the present disclosure is not limited thereto. For example, the width of the first light-blocking pattern LBM1*c* may be substantially the same as the width of the second light-blocking pattern LBM2*c*. For another example, the width of the first light-blocking pattern LBM1*c* may be less than the width of the second light-blocking pattern LBM2*c*.

FIG. 32 to FIG. 43 are diagrams illustrating a method of manufacturing the display device of FIG. 30.

FIG. 32, FIG. 33, FIG. 34, and FIG. 35 are diagrams illustrating a method of forming the first organic layer OL1*c* and the first transparent layer TRM1*c*.

Figure 32:
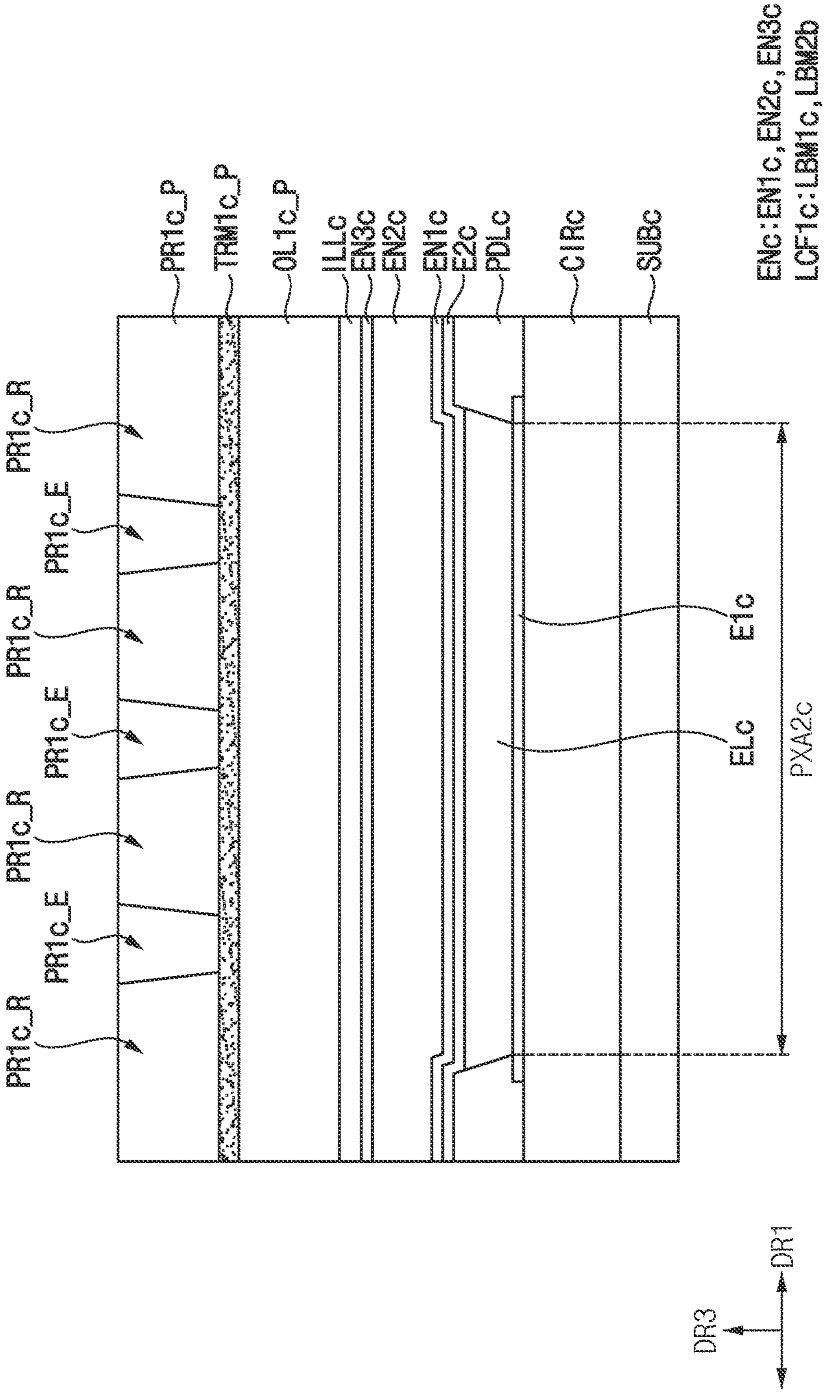
FIG. 32 to FIG. 43 are diagrams illustrating a method of manufacturing the display device of FIG. 30.

Referring to FIG. 32, a first preliminary organic layer OL1*c*_P may be formed on the etch protection layer ILLc. Materials included in the first preliminary organic layer OL1*c*_P may be substantially the same as the materials included in the first organic layer OL1*c*. For example, the first preliminary organic layer OL1*c*_P may include siloxane-based material and/or silica-based material. In this case, because the first preliminary organic layer OL1*c*_P includes the siloxane-based material and/or the silica-based material, the first preliminary organic layer OL1*c*_P may have improved light transmittance.

After forming the first preliminary organic layer OL1*c*_P, a first preliminary transparent layer TRM1*c*_P may be formed on the first preliminary organic layer OL1*c*_P. The first preliminary transparent layer TRM1*c*_P may include a transparent conductive material. For example, the first preliminary transparent layer TRM1*c*_P may include metal oxide (for example, ITO, etc.). For another example, the first preliminary transparent layer TRM1*c*_P may include metal (for example, aluminum, etc.).

After forming the first preliminary transparent layer TRM1*c*_P, a first preliminary photoresist layer PR1*c*_P may be formed on the first preliminary transparent layer TRM1*c*_P. The first preliminary photoresist layer PR1*c*_P may include photosensitive material.

After forming the first preliminary photoresist layer PR1*c*_P, a portion of the first preliminary photoresist layer PR1*c*_P may be exposed to light. In one or more embodiments, when the first preliminary photoresist layer PR1*c*_P includes positive type photoresist material, an elimination portion PR1*c*_E of the first preliminary photoresist layer PR1*c*_P may be exposed to light, and a remaining portion PR1*c*_R of the first preliminary photoresist layer PR1*c*_P may not be exposed to light. In one or more other embodiments, when the first preliminary photoresist layer PR1*c*_P includes negative type photoresist material, the elimination portion PR1*c*_E of the first preliminary photoresist layer PR1*c*_P may not be exposed to light, and the remaining portion PR1*c*_R of the first preliminary photoresist layer PR1*c*_P may be exposed to light.

Figure 33:
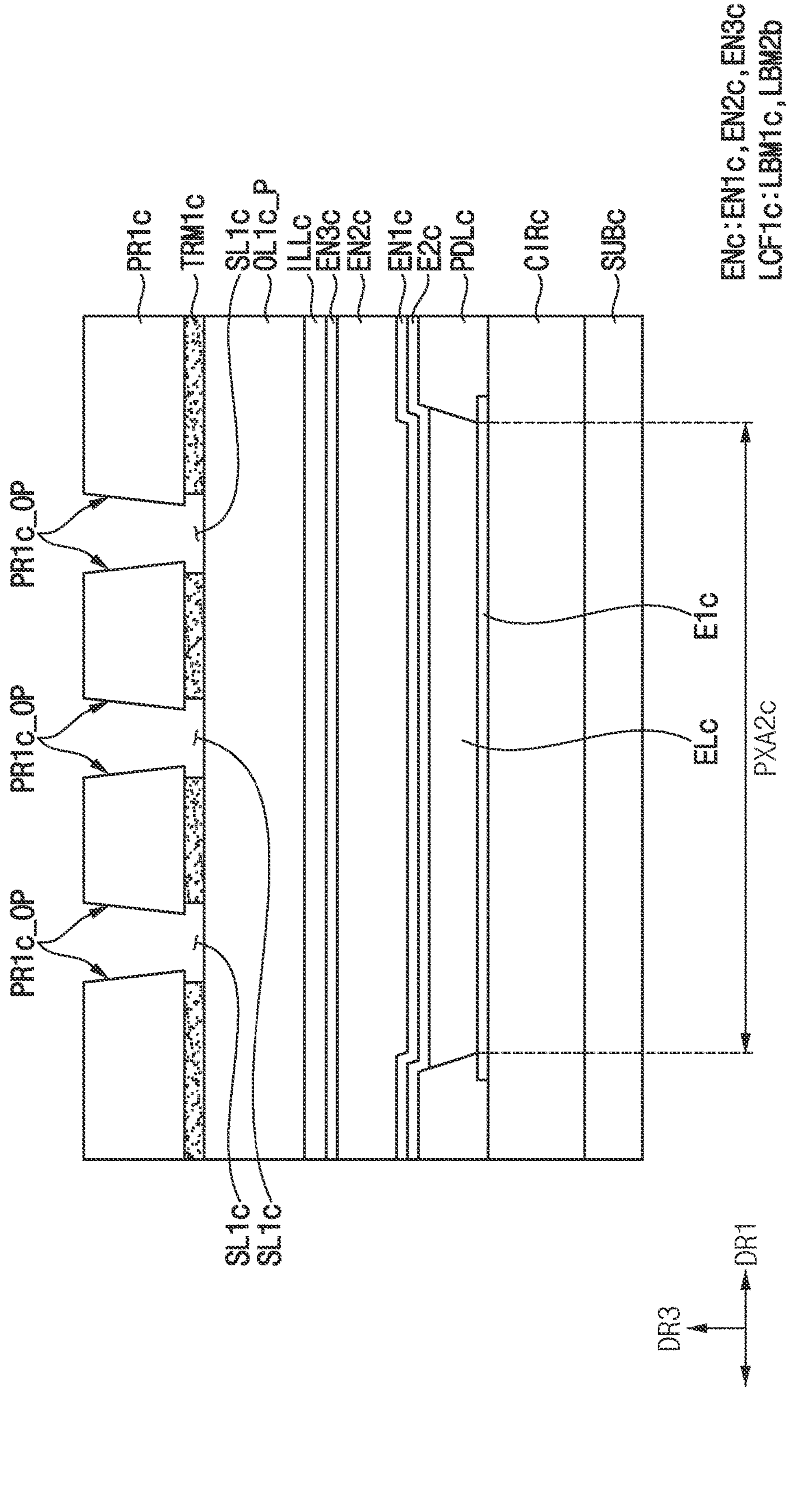

Referring to FIG. 33, after exposing the portion of the first preliminary photoresist layer PR1*c*_P, the elimination portion PR1*c*_E of the first preliminary photoresist layer PR1*c*_P may be developed. Accordingly, the elimination portion PR1*c*_E of the first preliminary photoresist layer PR1*c*_P may be removed, and the remaining portion PR1*c*_R of the first preliminary photoresist layer PR1*c*_P may form a first photoresist layer PR1*c*. In this case, a first opening PR1*c*_OP corresponding to the elimination portion PR1*c*_E of the first preliminary photoresist layer PR1*c*_P may be defined in the first photoresist layer PR1*c*. In this case, by the first opening PR1*c*_OP, a portion of an upper surface of the first preliminary transparent layer TRM1*c*_P described with reference to FIG. 32 may be exposed.

The first photoresist layer PR1*c* formed by exposing and developing of the first preliminary photoresist layer PR1*c*_P may have a positively tapered sides in a cross-sectional view. In other words, the first photoresist layer PR1*c* may have a trapezoidal shape in a cross-sectional view, and an upper side of the trapezoidal shape may be shorter than a lower side of the trapezoidal shape.

After forming the first photoresist layer PR1*c*, the first preliminary transparent layer TRM1*c*_P may be etched using the first photoresist layer PR1*c* as a mask. Accordingly, a portion of the first preliminary transparent layer TRM1*c*_P corresponding to the first opening PR1*c*_OP may be removed, and the first transparent layer TRM1*c* defining a first slit pattern SL1*c* may be formed. In this case, by the slit pattern SL1*c*, a portion of an upper surface of the first preliminary organic layer OL1*c*_P may be exposed.

In one or more embodiments, when the first preliminary transparent layer TRM1*c*_P includes metal oxide (for example, ITO, etc.), the portion of the first preliminary transparent layer TRM1*c*_P may be removed by wet-etching. In one or more other embodiments, when the first preliminary transparent layer TRM1*c*_P includes metal (for example, aluminum, etc.), the portion of the first preliminary transparent layer TRM1*c*_P may be removed by dry-etching. In this case, in the above-described embodiments, a width of the first slit pattern SL1*c* (e.g., in the first direction DR1) may be larger than a width of the first opening PR1*c*_OP adjacent to the first slit pattern SL1*c*. That is, an undercut space (e.g., refer to UCA1 of FIG. 19) not contacting the first transparent layer TRM1*c* may be formed at a lower surface of the first photoresist layer PR1*c*.

Figure 34:
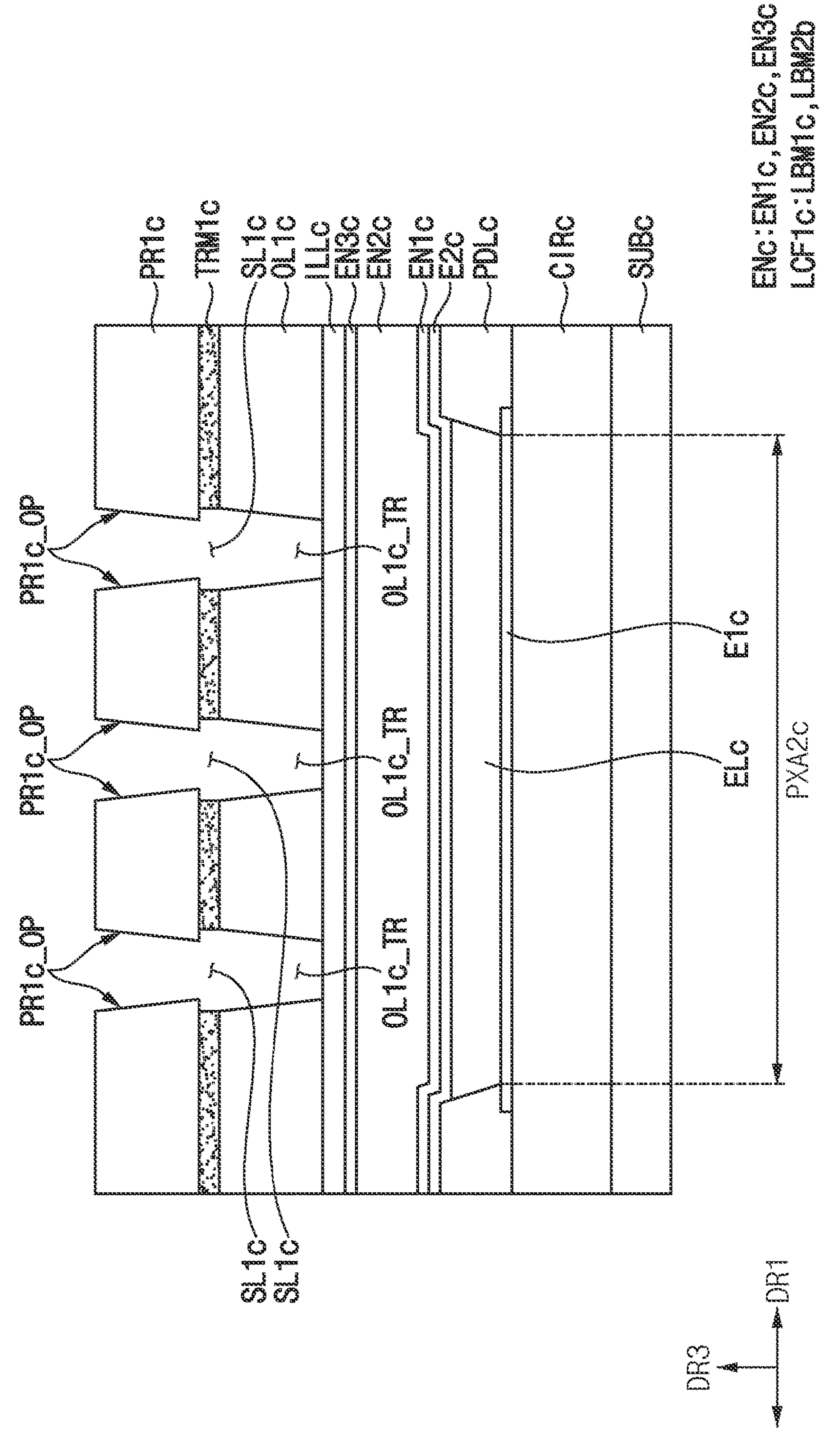

Referring to FIG. 34, the first organic layer OL1*c* may be formed by removing a portion of the first preliminary organic layer OL1*c*_P. For example, the portion of the first preliminary organic layer OL1*c*_P may be dry-etched using the first transparent layer TRM1*c* and the first photoresist layer PR1*c* as a mask. In this case, the first organic layer OL1*c* may define a first trench or groove OL1*c*_TR corresponding the portion of the first preliminary organic layer OL1*c*_P and exposing at least a portion of the etch protection layer ILLc.

Figure 35:
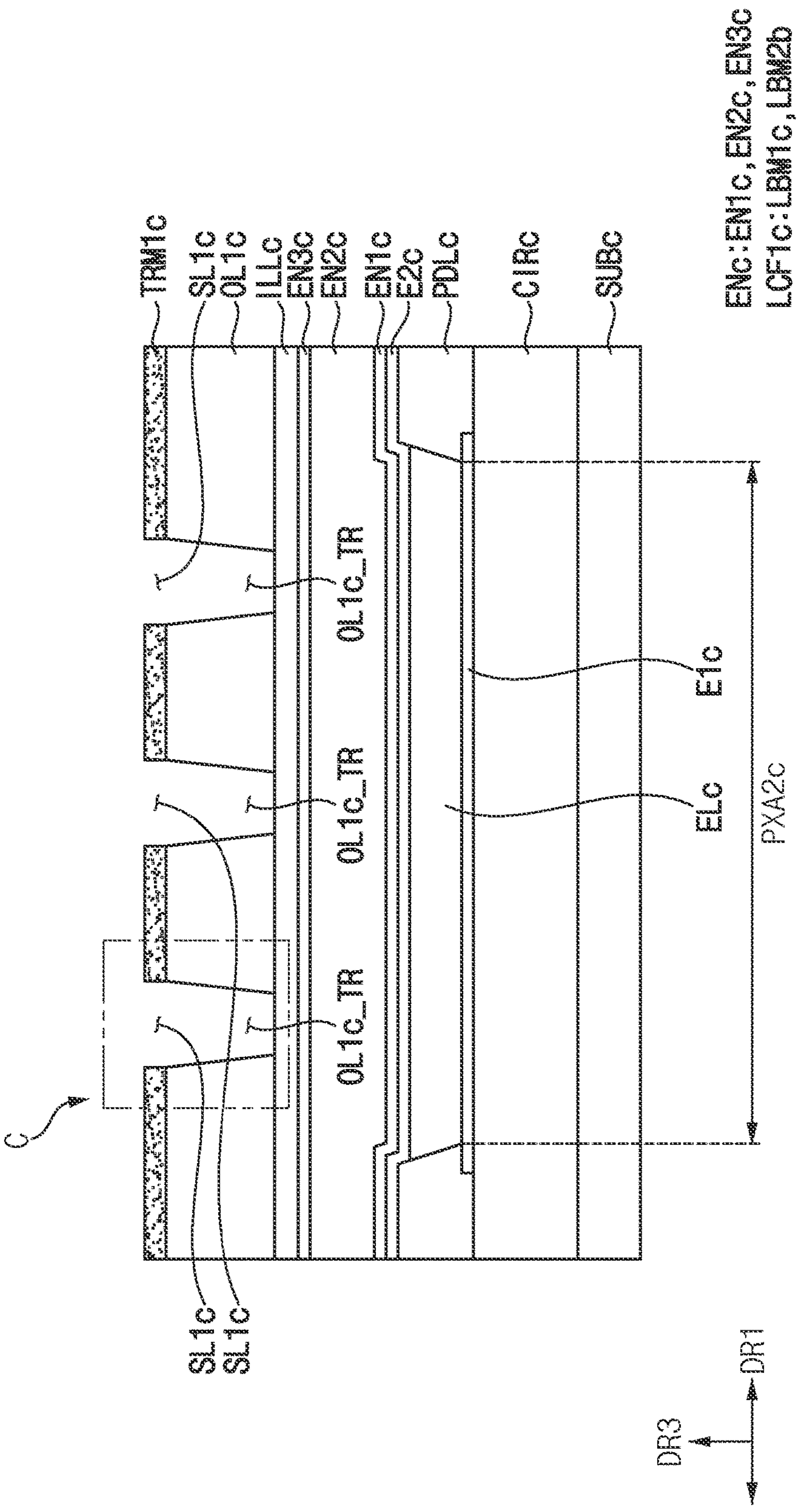

Referring to FIG. 35, after forming the first transparent layer TRM1*c*, the first photoresist layer PR1*c* may be removed. A method of removing the first photoresist layer PR1*c* is not limited, and various known methods may be used.

FIG. 36, FIG. 37, FIG. 38, and FIG. 39 are diagrams illustrating a method of forming the first light-blocking pattern LBM1*c*.

Figure 36:
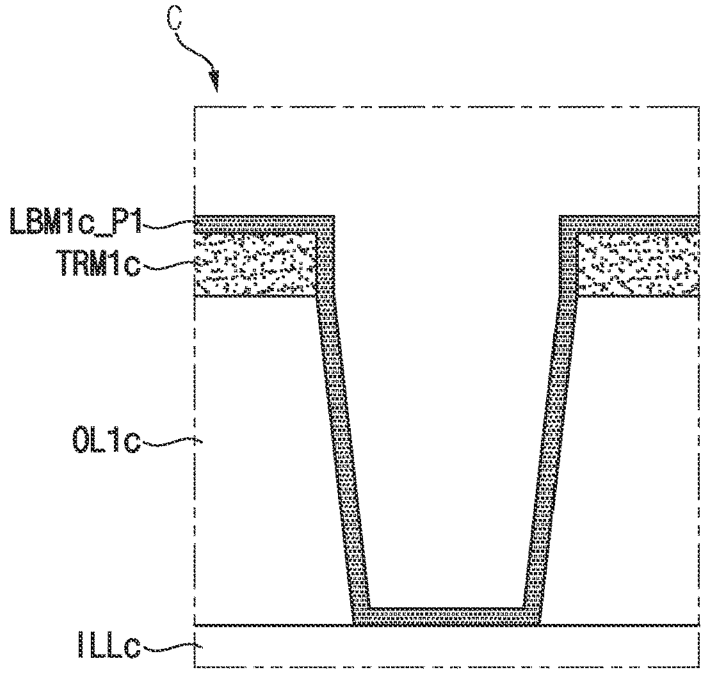

Referring to FIG. 36, a first light-blocking material may be deposited to cover an upper surface of the first transparent layer TRM1*c*, a side surface of the first transparent layer TRM1*c*, and the first trench or groove OL1*c*_TR formed in the first organic layer OL1*c*. The first light-blocking material may include metal (or metal oxide) having a relatively low reflectance.

In this case, after a relatively short time elapses after the start of the deposition of the first light-blocking material, the first light-blocking material may form a first deposition portion LBM1*c*_P1. The first deposition portion LBM1*c*_P1 may cover the upper surface of the transparent layer TRM1*c*, the side surface of the transparent layer TRM1*c*, the first trench or groove OL1*c*_TR formed in the first organic layer OL1*c*, and the etch protection layer ILLc exposed by the first trench or groove OL1*c*_TR. In this case, the first deposition portion LBM1*c*_P1 may have a relatively uniform and relatively small thickness.

Figure 37:
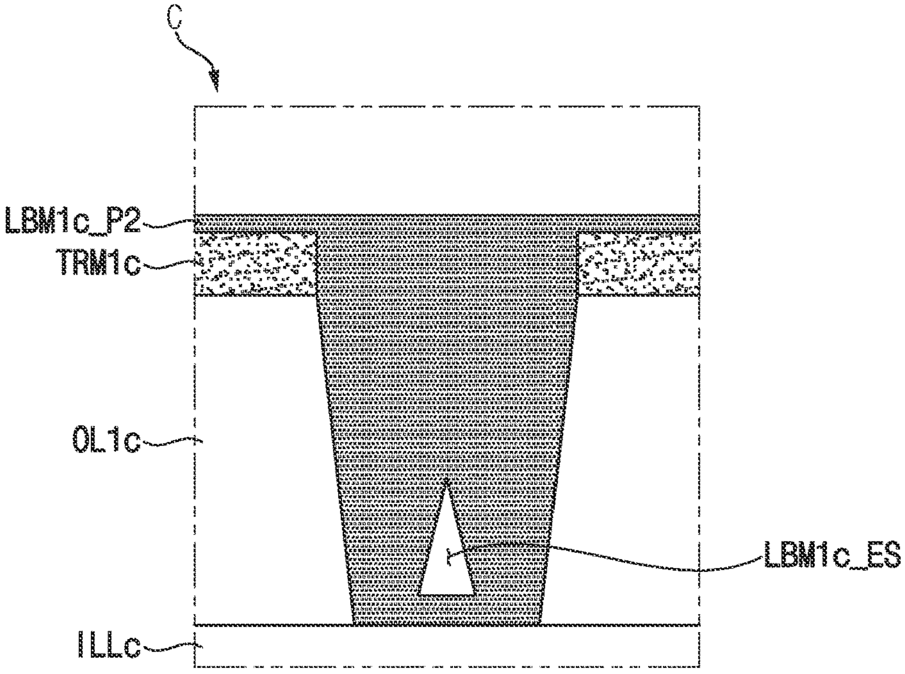

Referring to FIG. 37, after a relatively long time elapses after the start of the deposition of the first light-blocking material, the first light-blocking material may form a second deposition portion LBM1*c*_P2. In this case, the second deposition portion LBM1*c*_P2 may fill most of the first trench or groove OL1*c*_TR and the first slit pattern SL1*c*.

For example, the second deposition portion LBM1*c*_P2 may fill an upper portion of the first trench or groove OL1*c*_TR, and may fill a portion of a lower portion of the first trench or groove OL1*c*_TR adjacent to the upper portion of the first trench or groove OL1*c*_TR. In this case, the second deposition portion LBM1*c*_P2 may define a space, or inner space, LBM1*c*_ES defined at the lower portion of the first trench or groove OL1*c*_TR and not filled with the first light-blocking material. The space LBM1*c*_ES may be formed by depositing more of the first light-blocking material at the upper portion of the first trench or groove OL1*c*_TR than at the lower portion of the first trench or groove OL1*c*_TR as the deposition of the first light-blocking material proceeds. The space LBM1*c*_ES may be formed to be spaced apart from each of the first organic layer OL1*c* and the etch protection layer ILLc. That is, the space LBM1*c*_ES may be surrounded only by the first light-blocking material.

Figure 38:
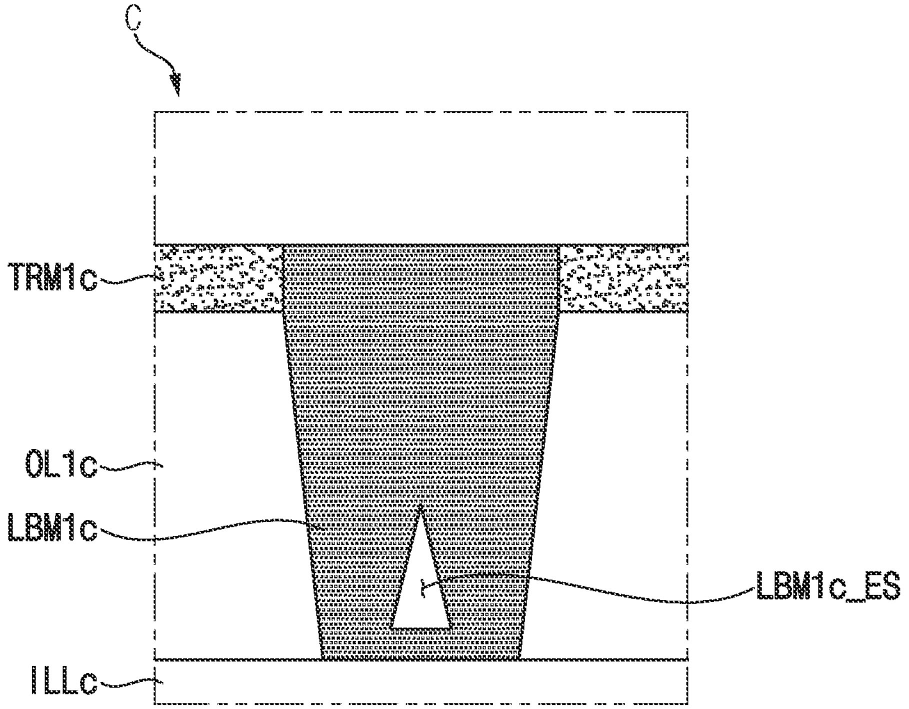
Figure 39:
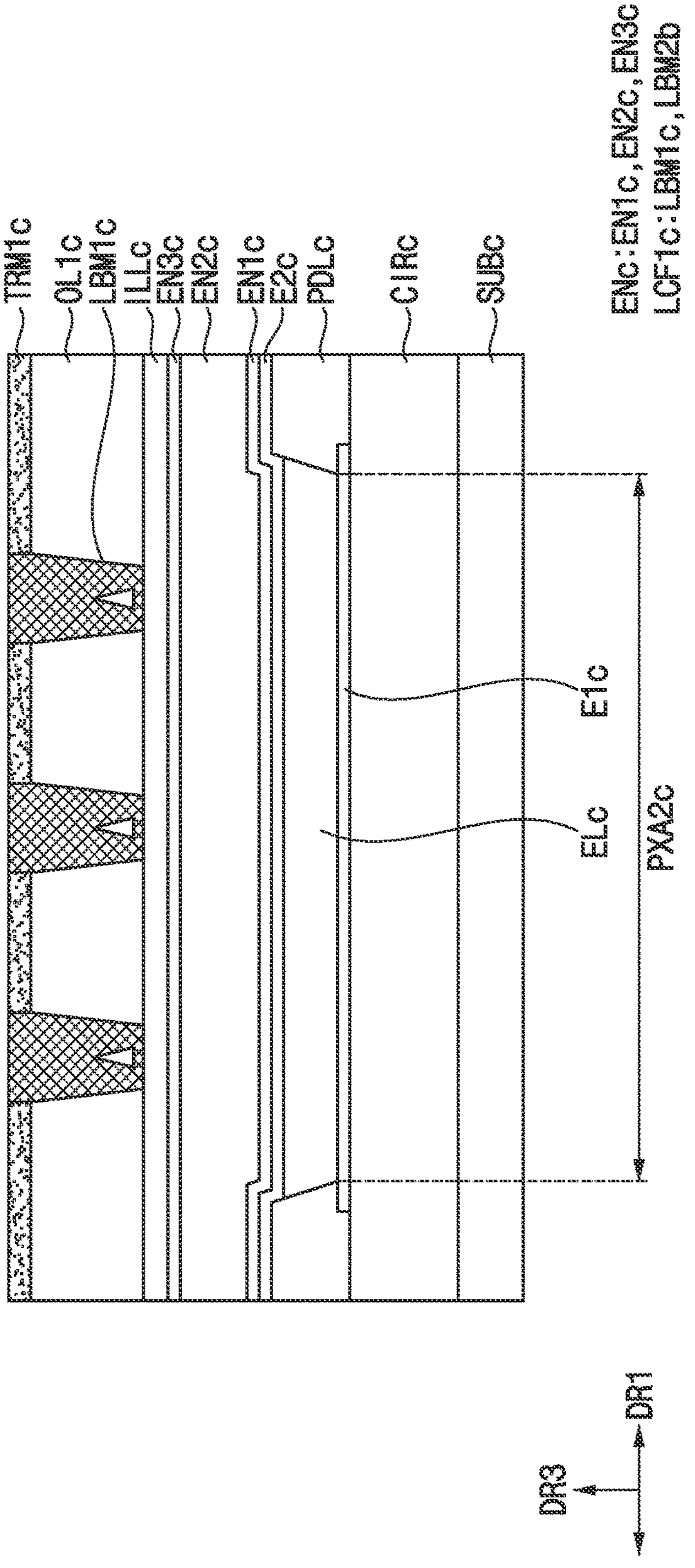

Referring to FIG. 38 and FIG. 39, the first light-blocking pattern LBM1*c* may be formed by removing a portion of the first light-blocking material positioned at a higher level than the upper surface of the first transparent layer TRM1*c*. Accordingly, a level of the upper surface of the first light-blocking pattern LBM1*c* may be substantially the same as a level of the upper surface of the first transparent layer TRM1*c*. The first light-blocking pattern LBM1*c* may directly contact the side surface of the first organic layer OL1*c* defining the first trench or groove OL1*c*_TR, the side surface of the first transparent layer TRM1*c* defining the first slit pattern SL1*c*, and the upper surface of the etch protection layer ILLc exposed by the first trench or groove OL1*c*_TR.

FIG. 40, FIG. 41, FIG. 42, and FIG. 43 are diagrams illustrating a method of forming the second organic layer OL2*c* and the second light-blocking pattern LBM2*c*.

Figure 40:
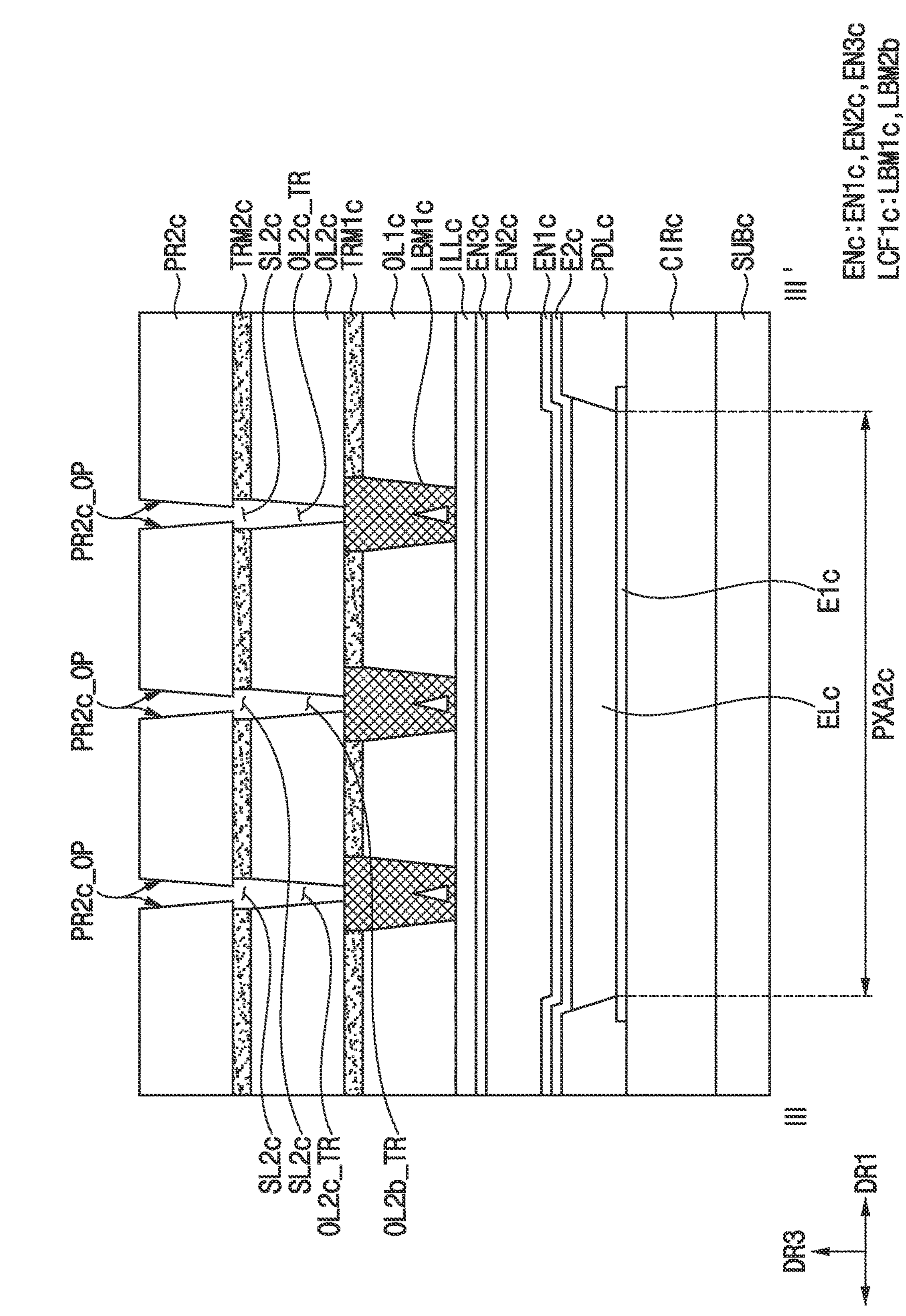

Referring to FIG. 40, the second organic layer OL2*c* defining a second trench or groove OL2*c*_TR, a second transparent layer TRM2*c* defining a second slit pattern SL2*c*, and a second photoresist layer PR2*c* defining a second opening PR2*c*_OP may be formed on the first transparent layer TRM1*c*. A method of forming the second organic layer OL2*c*, the second transparent layer TRM2*c*, and the second photoresist layer PR2*c* may be substantially the same as the method of forming the second organic layer OL2*b*, the second transparent layer TRM2*b*, and the second photoresist layer PR2*b* described with reference to FIG. 23, FIG. 24, FIG. 25, and FIG. 26.

Figure 41:
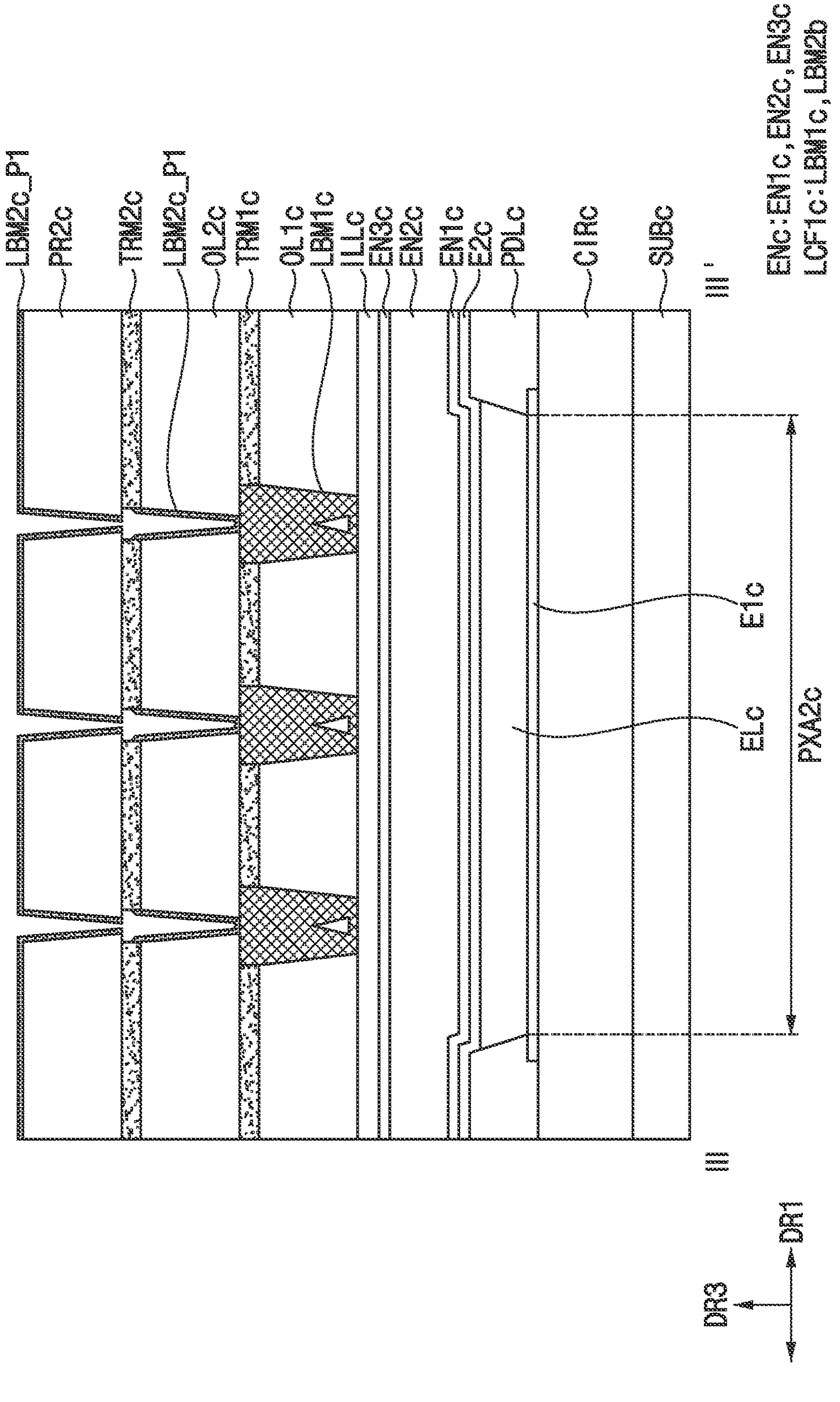

Referring to FIG. 41, a second light-blocking material may be deposited to cover an upper surface and a side surface of the second photoresist layer PR2*c*, at least a portion of a side surface of the second transparent layer TRM2*c*, and a side surface of the second organic layer OL2*c* defining the second trench or groove OL2*c*_TR. The second light-blocking material may include metal (or metal oxide) having a relatively low reflectance.

In this case, after a relative short time elapses after the start of the deposition of the second light-blocking material, the second light-blocking material may form a first deposition portion LBM2*c*_P1. The first deposition portion LBM2*c*_P1 may cover the upper surface and the side surface of the second photoresist layer PR2*c*, the second trench or groove OL2*c*_TR formed in the second organic layer OL2*c*, and the first light-blocking pattern LBM1*c* exposed by the second trench or groove OL2*c*_TR. In this case, the first deposition portion LBM2*c*_P1 may have a relatively uniform and relatively small thickness.

Figure 42:
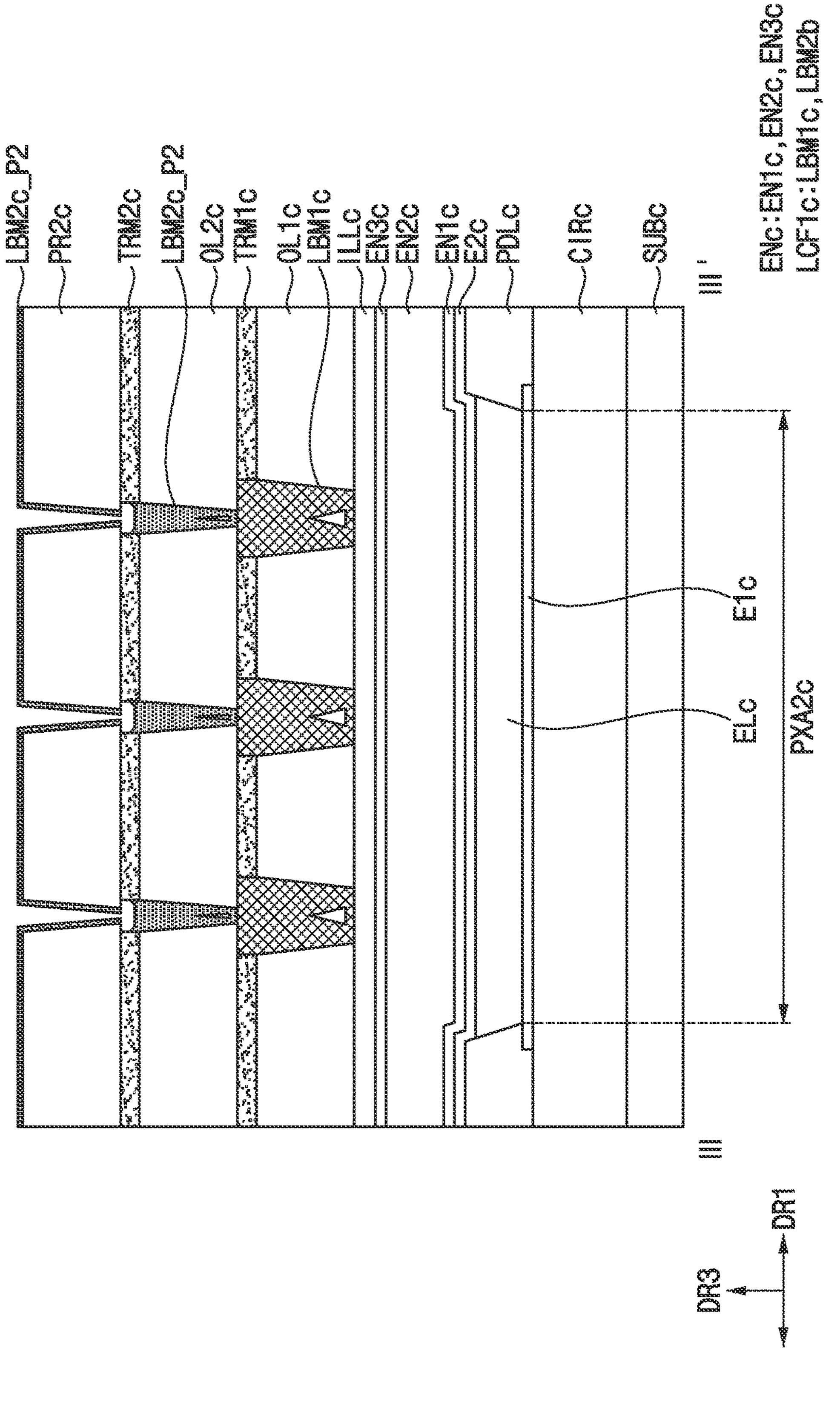

Referring to FIG. 42, after a relatively long time elapses after the start of the deposition of the second light-blocking material, the second light-blocking material may form a second deposition portion LBM2*c*_P2. In this case, the second deposition portion LBM2*c*_P2 may fill most of the second trench or groove OL2*c*_TR.

For example, the second deposition portion LBM2*c*_P2 may fill an upper portion of the second trench or groove OL2*c*_TR, and may fill a portion of a lower portion of the second trench or groove OL2*c*_TR that is adjacent to the upper portion of the second trench or groove OL2*c*_TR. In this case, the second deposition portion LBM2*c*_P2 may define a space defined at the lower portion of the second trench or groove OL2*c*_TR and not filled with the second light-blocking material. The space may be surrounded only by the second light-blocking material.

The second light-blocking material may not be substantially deposited at an undercut space defined as a space in which the lower surface of the second photoresist layer PR2*c* does not substantially contact the second transparent layer TRM2*c*.

Figure 43:
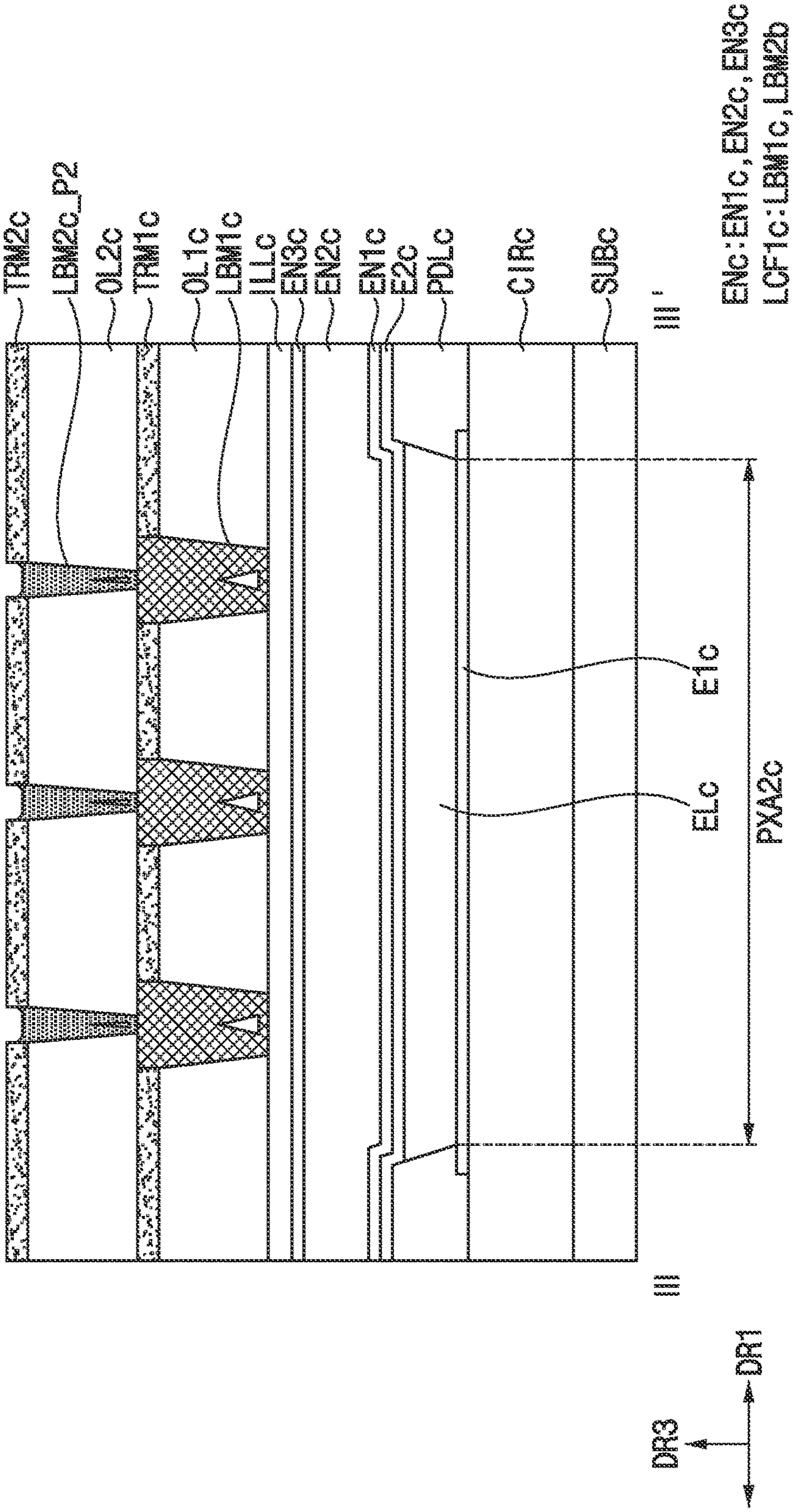

Referring to FIG. 43, the second photoresist layer PR2*c* may be removed by lifting-off the second photoresist layer PR2*c*. For example, the second photoresist layer PR2*c* may be removed by penetrating a developer into an interface between the second photoresist layer PR2*c* and the second transparent layer TRM2*c* through the undercut space not covered by the second light-blocking material.

As the second photoresist layer PR2*c* is removed, the second light-blocking material covering the upper surface and the side surface of the second photoresist layer PR2*c* may also be removed.

In one or more embodiments, after removing the second photoresist layer PR2*c*, the second light-blocking pattern LBM2*c* may be formed by removing a portion of the second light-blocking material and the second transparent layer TRM2*c* positioned at a higher level than the upper surface of the second organic layer OL2*c*. Accordingly, a level of the upper surface of the second light-blocking pattern LBM2*c* may be substantially the same as a level of the upper surface of the second organic layer OL2*c*. The second light-blocking pattern LBM2*c* may directly contact side surfaces of the second organic layer OL2*c* defining the second trench or groove OL2*c*_TR and an upper surface of the first light-blocking pattern LBM1*c* exposed by the second trench or groove OL2*c*_TR.

The foregoing is illustrative of embodiments and is not to be construed as limiting thereof. Although a few embodiments have been described, those skilled in the art will readily appreciate that many modifications are possible in the embodiments without materially departing from the novel teachings and aspects of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be included therein.

What is claimed is:

1. A display device comprising:

a light-emitting element;

an encapsulation layer covering the light-emitting element;

an etch protection layer on the encapsulation layer;

a first light-blocking pattern protruding from an upper surface of the etch protection layer, and comprising a first light-blocking material;

an organic layer covering the first light-blocking pattern, and defining a trench exposing an upper surface of the first light-blocking pattern; and a second light-blocking pattern in the trench, comprising a second light-blocking material, and defining an inner space completely surrounded by the second light-blocking material, wherein a width of a lower portion of the inner space is greater than a width of an upper portion of the inner space in a cross sectional view.

2. The display device of claim 1, wherein the first light-blocking material comprises a photoresist material, and wherein the second light-blocking material comprises metal or metal oxide.

3. The display device of claim 1, wherein the first light-blocking pattern has tapered sides in the cross sectional view such that a lower surface of the first light-blocking pattern that is adjacent the upper surface of the etch protection layer is wider than the upper surface of the first light-blocking pattern, and wherein the lower surface of the first light-blocking pattern is closer to the light-emitting element than the upper surface of the first light-blocking pattern.

4. The display device of claim 1, wherein an upper surface of the organic layer and an upper surface of the second light-blocking pattern are substantially level.

5. A display device comprising:

a light-emitting element;

an encapsulation layer covering the light-emitting element;

an etch protection layer on the encapsulation layer;

a first organic layer on the etch protection layer, and defining a first trench exposing a portion of an upper surface of the etch protection layer;

a first light-blocking pattern in the first trench, comprising a first light-blocking material, and defining a first inner space completely surrounded by the first light-blocking material;

a second organic layer on the first organic layer, and defining a second trench exposing at least a portion of the first light-blocking pattern; and a second light-blocking pattern in the second trench, comprising a second light-blocking material, and defining a second inner space completely surrounded by the second light-blocking material, wherein a width of a lower portion of the first inner space is greater than a width of an upper portion of the first inner space in a cross sectional view, and wherein a width of a lower portion of the second inner space is greater than a width of an upper portion of the second inner space in the cross sectional view.

6. The display device of claim 5, wherein the first light-blocking material and the second light-blocking material comprise metal or metal oxide.

7. The display device of claim 5, wherein the first light-blocking pattern directly contacts the second light-blocking pattern.

8. The display device of claim 5, wherein a refractive index of the first organic layer is different from a refractive index of the second organic layer.

9. The display device of claim 5, wherein an upper surface of the second organic layer and an upper surface of the second light-blocking pattern are substantially level.

10. A display device comprising:

a light-emitting element;

an encapsulation layer covering the light-emitting element;

an etch protection layer on the encapsulation layer;

a first organic layer on the etch protection layer, and defining a first trench exposing a portion of an upper surface of the etch protection layer;

a first light-blocking pattern in the first trench, comprising a first light-blocking material, and defining a first inner space surrounded by the first light-blocking material;

a second organic layer on the first organic layer, and defining a second trench exposing at least a portion of the first light-blocking pattern;

a second light-blocking pattern in the second trench, comprising a second light-blocking material, and defining a second inner space surrounded by the second light-blocking material; and a first transparent layer between the first organic layer and the second organic layer, and defining a first slit pattern corresponding to the first trench.

11. The display device of claim 10, wherein the first light-blocking pattern is in the first slit pattern, and wherein an upper surface of the first light-blocking pattern and an upper surface of the first transparent layer are substantially level.

* * * * *